US011049147B2

(12) United States Patent
Chintalapoodi et al.

(10) Patent No.: US 11,049,147 B2
(45) Date of Patent: Jun. 29, 2021

(54) SYSTEM AND METHOD FOR PROVIDING RECOMMENDATION ON AN ELECTRONIC DEVICE BASED ON EMOTIONAL STATE DETECTION

(71) Applicant: SONY CORPORATION, Tokyo (JP)

(72) Inventors: Pramod Chintalapoodi, San Diego, CA (US); Hemant Sadhwani, Bangalore (IN); Madhvesh Sulibhavi, Bangalore (IN)

(73) Assignee: SONY CORPORATION, Tokyo (JP)

( * ) Notice: Subject to any disclaimer, the term of this patent is extended or adjusted under 35 U.S.C. 154(b) by 307 days.

(21) Appl. No.: 15/260,502

(22) Filed: Sep. 9, 2016

(65) Prior Publication Data
US 2018/0075490 A1    Mar. 15, 2018

(51) Int. Cl.
*G06Q 30/00* (2012.01)
*G06Q 30/02* (2012.01)
(Continued)

(52) U.S. Cl.
CPC ..... *G06Q 30/0269* (2013.01); *G06K 9/00302* (2013.01); *G06K 9/00335* (2013.01);
(Continued)

(58) Field of Classification Search
CPC ....... G06K 21/00302; G06K 21/00335; H04N 21/44218; H04N 21/4668
See application file for complete search history.

(56) References Cited

U.S. PATENT DOCUMENTS

2007/0270664 A1   11/2007   Ishii et al.
2012/0143693 A1    6/2012   Chung et al.
(Continued)

FOREIGN PATENT DOCUMENTS

CN   102404680 A   4/2012
CN   102929660 A   2/2013
(Continued)

OTHER PUBLICATIONS

Stephen Schenck, "Microsoft's Project Oxford Lets Apps Identify Your Emotions", Pocketnow, Nov. 11, 2015 Available at : http://pocketnow.com/2015/11/11/recognize-emotions.
(Continued)

*Primary Examiner* — Alvin L Brown
(74) *Attorney, Agent, or Firm* — Chip Law Group

(57) ABSTRACT

Various aspects of a system and a method to provide recommendation on an electronic device based on emotional state detection of a user, are disclosed herein. In accordance with an embodiment, the system includes the electronic device, which is configured to detect a transition in an emotional state of a user associated with the electronic device from a first emotional state to a second emotional state. A tagged content item associated with the second emotional state of the user is retrieved from a network device based on identity information of the user and the detected transition. An application is launched on the electronic device to recommend a product or a service related to the retrieved tagged content item. The application is launched in response to the detected transition in the emotional state of the user and a current location of the electronic device.

9 Claims, 10 Drawing Sheets

(51) Int. Cl.
*G06K 9/00* (2006.01)
*H04N 21/442* (2011.01)
*H04N 21/466* (2011.01)

(52) U.S. Cl.
CPC ..... *G06Q 30/0261* (2013.01); *G06Q 30/0282* (2013.01); *H04N 21/44218* (2013.01); *H04N 21/4668* (2013.01)

(56) References Cited

U.S. PATENT DOCUMENTS

| | | | |
|---|---|---|---|
| 2013/0159228 A1 | 6/2013 | Meijer et al. | |
| 2014/0143064 A1* | 5/2014 | Tran | A61B 5/0022 705/14.66 |
| 2014/0207811 A1 | 7/2014 | Kim et al. | |
| 2014/0317646 A1 | 10/2014 | Garza et al. | |
| 2015/0067708 A1 | 3/2015 | Jensen | |
| 2015/0127628 A1* | 5/2015 | Rathod | H04W 4/21 707/710 |
| 2016/0085802 A1* | 3/2016 | Rios, III | G06Q 30/0269 705/14.66 |
| 2016/0180379 A1* | 6/2016 | Salmon | G06Q 30/0255 705/14.53 |
| 2017/0314951 A1 | 11/2017 | Lee et al. | |
| 2018/0025368 A1* | 1/2018 | Frank | G06Q 30/0282 705/7.29 |
| 2019/0197073 A1* | 6/2019 | Liu | G06F 16/9535 |
| 2020/0104616 A1* | 4/2020 | el Kaliouby | G06K 9/00335 |

FOREIGN PATENT DOCUMENTS

| | | |
|---|---|---|
| CN | 103093752 A | 5/2013 |
| CN | 104597825 A | 5/2015 |
| CN | 105045916 A | 11/2015 |
| EP | 2921106 A | 9/2015 |
| JP | 2005-032167 A | 2/2005 |
| JP | 2006-127057 A | 5/2006 |
| JP | 2009-282824 A | 12/2009 |
| JP | 2013-171334 A | 9/2013 |
| JP | 2015-184763 A | 10/2015 |
| JP | 2016-085526 A | 5/2016 |
| JP | 2016-136294 A | 7/2016 |
| KR | 10-2015-0131421 A | 11/2015 |

OTHER PUBLICATIONS

Office Action for KR Patent Application No. 10-2017-0113156, dated Jan. 17, 2018, 6 pages of Office Action and 6 pages of English Translation.
Office Action for KR Patent Application No. 10-2017-0113156, dated Jul. 25, 2018, 06 pages pf Office Action and 05 pages of English Translation.
Office Action for JP Patent Application No. 2017-170947, dated Jul. 25, 2018, 3 pages of Office Action and 3 pages of English Translation.
Office Action for KR Patent Application No. 10-2017-0113156, dated Feb. 22, 2019, 07 pages of Office Action and 08 pages of English Translation.

* cited by examiner

SYSTEM AND METHOD FOR PROVIDING RECOMMENDATION ON AN ELECTRONIC DEVICE BASED ON EMOTIONAL STATE DETECTION

CROSS-REFERENCE TO RELATED APPLICATIONS/INCORPORATION BY REFERENCE

None.

FIELD

Various embodiments of the disclosure relate to detection of emotional states of a user. More specifically, various embodiments of the disclosure relate to system and method for providing recommendation on an electronic device based on an emotional state detection of a user.

BACKGROUND

It is known that emotions play an important role in human life, and may result in certain physiological and behavioral manifestations, such as a change in heartbeat or facial expressions. Although attempts have been made to identify user's emotions, existing systems may still lack the ability to connect with a user emotionally or empathetically. Existing systems that focus on recommending relevant content to users may hardly take into account changes in human emotional states suited to practical use by end consumers. Thus, an advanced system may be required, where such changes in human emotional states may be employed in an intelligent manner to provide emotion-based recommendations with enhanced practical usability.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method to provide recommendation on an electronic device based on an emotional state detection of a user, are provided, substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

Figure 1:
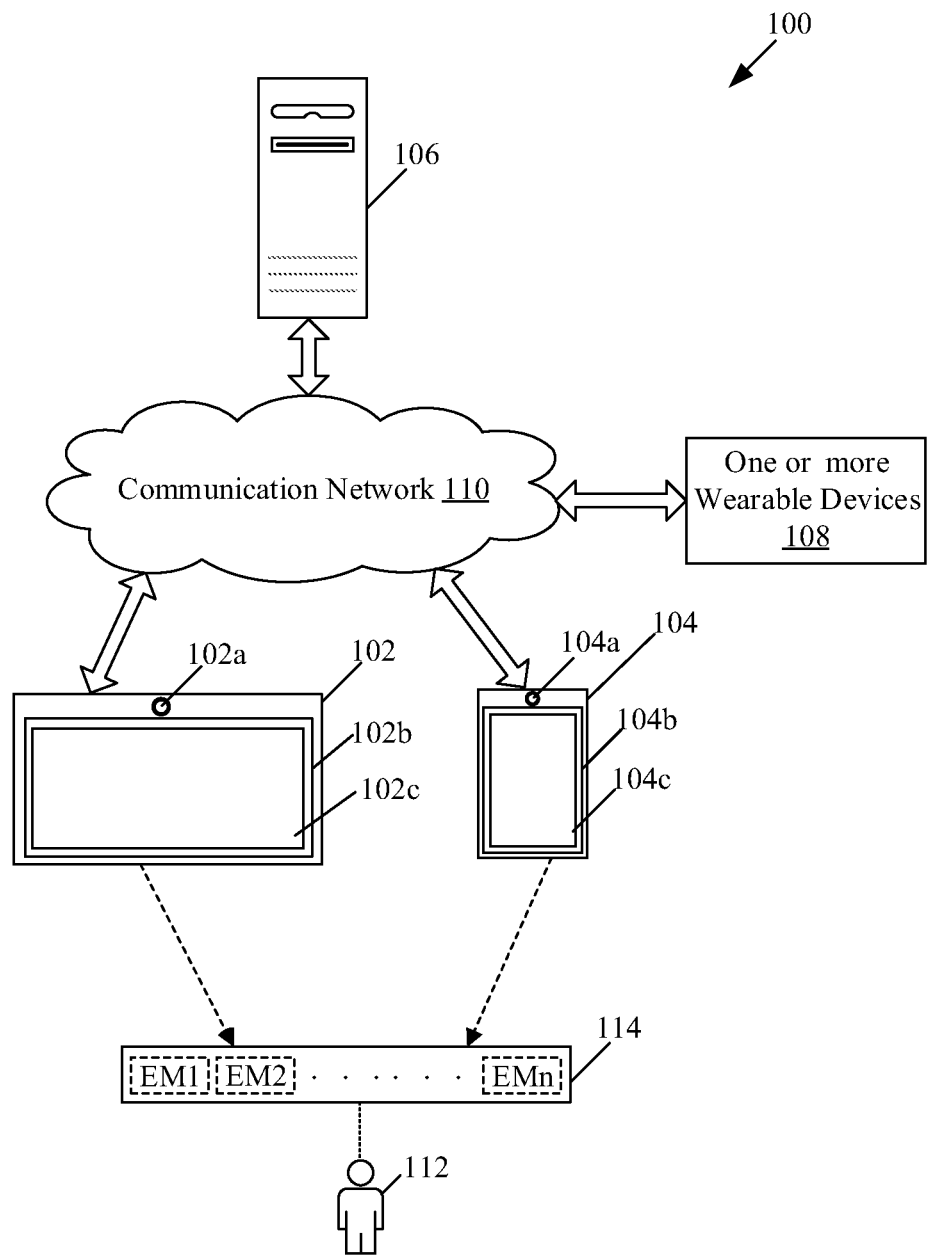
FIG. 1 is a block diagram that illustrates a network environment to provide recommendation on an electronic device based on emotional state detection of a user, in accordance with an embodiment of the disclosure.

The following described implementations may be found in the disclosed system and method to provide recommendation on an electronic device based on emotional state detection of a user. Exemplary aspects of the disclosure may include an electronic device, which may detect a transition in an emotional state of a user associated with the electronic device from a first emotional state to a second emotional state. A tagged content item associated with the second emotional state of the user may be retrieved from a network device based on identity information of the user and the detected transition. An application may be launched on the electronic device to recommend a product or a service related to the retrieved tagged content item. The application may be launched in response to the detected transition in the emotional state of the user and a current location of the electronic device.

In accordance with an embodiment, the first emotional state and the second emotional state may correspond to neutral, happy, sad, anger, contempt, fear, surprise, confused, and tender. The network device may correspond to a server, another electronic device connected to the electronic device in a wireless home network, and/or a cloud based service.

In accordance with an embodiment, sensor data may be received from a wearable device associated with the user and/or an in-built camera of the electronic device. The sensor data may also correspond to a text-based input on the electronic device and/or a voice-based input on the electronic device, for the detection of the transition in the emotional state of the user.

In accordance with an embodiment, the product or the service may be searched based on the retrieved tagged content item on the electronic device. A home screen interface of the electronic device may be dynamically customized based on the detected transition in the emotional state of the user. The home screen interface of the electronic device may be dynamically customized further based on a last tagged content item associated with the second emotional state in the network device.

In accordance with an exemplary aspect of the disclosure, a transition in an emotional state may be detected for a user viewing a content item on the electronic device from a first emotional state to a second emotional state. A portion of the content item viewed during the detected transition may be associated with the second emotional state of the user. A cause of the detected transition to the second emotional state may be identified in the portion of the content item associated with the second emotional state. A recommendation may be generated for a product or service based on the identified cause. The recommendation may be generated in response to the detected transition in the emotional state of the user and a current location of the electronic device.

In accordance with an embodiment, the identified cause in the portion of the content item may correspond to an image frame, an object in the image frame, a context of the portion of the content item. A level of the second emotional state of the user may be determined during viewing of the content item on the electronic device. The portion of the content item may be associated with the second emotional state when the determined level is greater than a threshold.

In accordance with an embodiment, the identified cause in the portion of the content item may be tagged with the second emotional state, identity information of the user, a timestamp of the detected transition, and/or the determined level of the second emotional state. The product or the service related to the tagged cause associated with the second emotional state may be searched in real-time or near real-time by use of a pre-specified search engine for the recommendation.

In accordance with an embodiment, the tagged cause in the portion of the content item may be communicated to a server or a network device communicatively coupled to the electronic device. Display of the generated recommendation for the product or the service may be controlled on the electronic device or another electronic device communicatively coupled to the electronic device.

In accordance with an embodiment, a notification may be communicated to another electronic device to unlock a home screen interface of the other electronic device to display the generated recommendation. In accordance with an embodiment, the generated recommendation may be updated based on a machine learning associated with a usage pattern of the generated recommendation.

FIG. 1 is a block diagram that illustrates a network environment to provide recommendation on an electronic device based on emotional state detection of a user, in accordance with an embodiment of the disclosure. With reference to FIG. 1, there is shown an exemplary network environment 100. The exemplary network environment 100 may include one or more electronic devices, such as a first electronic device 102 and a second electronic device 104, a server, 106, one or more wearable devices 108, a communication network 110, and one or more users, such as a user 112. There is further shown a plurality of emotional states 114 associated with the user 112.

The first electronic device 102 may include an image-capturing unit 102a, a display screen 102b, and an application interface 102c rendered on the display screen 102b. Similarly, the second electronic device 104 may include an image-capturing unit 104a, a display screen 104b, and an application interface 104c. The first electronic device 102, the second electronic device 104, and the server 106 may be network devices that may be communicatively coupled with each other via the communication network 110. The one or more wearable devices 108 may be communicatively coupled to one of the one or more electronic devices, such as the first electronic device 102 or the second electronic device 104, via a separate short-range communication channel, or via the communication network 110. The user 112 may be associated with the one or more wearable devices 108, the first electronic device 102, and/or the second electronic device 104.

The one or more electronic devices, such as the first electronic device 102 and the second electronic device 104, may comprise suitable logic, circuitry, interfaces, and/or code that may be configured to detect a transition in an emotional state of the user 112 from a first emotional state to a second emotional state. Examples of the first electronic device 102 and the second electronic device 104 may include, but are not limited to, a smart television (TV), a smartphone, a display device, a laptop, a tablet computer, a camera, an action cam, a camcorder, a digital signage, a projector, and/or a video-processing device.

The image-capturing units 102a and 104a may comprise suitable logic, circuitry, interfaces, and/or code that may be configured to capture one or more images or a video of the user 112. In accordance with an embodiment, the image-capturing units 102a and 104a may refer to an in-built camera or an image sensor of respective electronic device.

The display screens 102b and 104b may comprise suitable logic, circuitry, interfaces, and/or code that may be configured to render respective application interfaces 102c and 104c, as shown. The display screens 102b and 104b may be realized through several known technologies, such as Liquid Crystal Display (LCD), Light Emitting Diode (LED) based display, Organic LED display technology, Retina display technology, and/or the like.

The application interfaces 102c and 104c may correspond to applications pre-stored at respective electronic devices, such as the first electronic device 102 and the second electronic device 104. The application interface 102c may be configured to render one or more content items, such as a video or TV programs, on the display screen 102b of the first electronic device 102. The application interface 104c may be rendered on the display screen 104b of the second electronic device 104. The application interface 104c may facilitate interaction of the user 112 with the second electronic device 104, such as a smartphone. In accordance with an embodiment, the application interface 104c may correspond to a home screen displayed on the display screen 104b of the second electronic device 104.

The server 106 may comprise suitable logic, circuitry, interfaces, and/or code that may be configured to receive and store tagged content items, or a portion of a content item, such as a sequence of image frames, tagged with a particular emotional state of a user, such as the user 112, from the first electronic device 102. The transitions in the emotional states of the user 112 may be monitored and continuously tracked by use of the various electronic devices, such as the first electronic device 102, the second electronic device 104, and the one or more wearable devices 108. The server 106 may be further configured to receive information related to detected transitions in emotional states with timestamps from various electronic devices, such as the first electronic device 102, the second electronic device 104, and the one or more wearable devices 108. The server 106 may be a cloud based server, a web server, a database server, a file server, an application server, or a combination thereof. The server 106 may be implemented by use of several technologies that are well known to those skilled in the art.

The one or more wearable devices 108 may be refer to wearable electronics and/or electronic implants. The one or more wearable devices 108 may comprise suitable logic, circuitry, interfaces, and/or code that may be configured to communicate sensor data to a connected device, such as the first electronic device 102 or the second electronic device 104. The one or more wearable devices 108 may be worn by the user 112. For example, a smart glass, a smart band, or a smart watch worn by the user 112 may be used to measure calorie intake, calories burned, sleep patterns, and/or physiological parameters, such as perspiration or heart rate, or physical activity of the user 112. Examples of the one or more wearable devices 108 may include, but are not limited to, a wearable cardiac-event recorder, a biocompatible sensor (that may be attached, worn, or implanted into a human body to predict ovulation cycle, monitor physiological parameters, such as heart rate, pulse oximetry, respiratory rate, and/or blood pressure), an implantable radio frequency device, such as the, "Obamacare microchip RFID implant", and/or other such wearable or implantable device that may provide sensor data related to monitoring of physiological parameters of the user 112 for tracking of emotional states of the user 112.

The communication network 110 may include a medium through which the first electronic device 102, the second electronic device 104, the one or more wearable devices 108, and the server 106, may communicate with each other. The communication network 110 may be a wireless communication network. Examples of the communication network 110 may include, but are not limited to, a Wireless Local Area Network (WLAN), such as a wireless home network, a cloud network, "All-joyn" or Internet-of-Things (IoT) communication framework, a Long Term Evolution (LTE) network, a plain old telephone service (POTS), a Metropolitan Area Network (MAN), and/or the Internet. Various devices in the exemplary network environment 100 may be configured to connect to the communication network 110, in accordance with various wireless communication protocols. Examples of such wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols.

The plurality of emotional states 114 refers to emotional states of the one or more users, such as the user 112, detected by the first electronic device 102 and/or the second electronic device 104. The plurality of emotional states 114, such as "EM1, EM2, EM3, . . . , EMn", may include neutral, happy, sad, anger, contempt, fear, surprise, confused, and/or tender emotions. The plurality of emotional states 114 may be detected based on one or more images or a video of the user 112 captured by the image-capturing units 102a or 104a. In accordance with an embodiment, each of the one or more users, such as the user 112, may be associated with one or more wearable devices 108 which may be communicatively coupled with the first electronic device 102 and/or the second electronic device 104. The sensor data received from the one or more wearable devices 108 may be further utilized to monitor or track a transition in an emotional state of the user 112.

In operation, the first electronic device 102 may be configured to receive one or more content items. The one or more content items may be received from the server 106, other server of a network service provider (not shown), or a network device, via the communication network 110. The one or more content items may be a video, such as a TV show of a TV channel, a movie, a TV advertisement received from the subscribed network service provider. The one or more content items may also be videos, images, or other files pre-stored at the first electronic device 102 or a network device connected in a wireless network, such as the communication network 110. The one or more content items may further correspond to web content accessible from the Internet by the first electronic device 102. The first electronic device 102 may be configured to render at least a content item, such as a video, from the received content items via the application interface 102c.

In accordance with an embodiment, the one or more users, such as the user 112, may be viewing the rendered content item, such as the video, on the display screen 102b. The first electronic device 102 may capture one or more images or a video of the user 112 who may be viewing the content item on the first electronic device 102, by use of the image-capturing unit 102a. Further, the sensor data received from the one or more wearable devices 108 may be further utilized to monitor or track physiological and/or behavioral characteristics of the user 112 to detect a transition in an emotional state of the user 112.

In accordance with an embodiment, the first electronic device 102 may be configured to detect a transition in an emotional state of the user 112, viewing the first content item on the first electronic device 102, from a first emotional state to a second emotional state. For example, a transition from a neutral emotional state to an excited emotional state of the user 112. The first emotional state and the second emotional state may correspond to the plurality of the emotional states 114.

In accordance with an embodiment, a voice-based input or a text based input may be provided on another electronic device, such as the second electronic device 104, while viewing the first content item on the first electronic device 102. The second electronic device 104 may also monitor emotional states of the user 112 based on the received voice-based input and/or the text-based input. When a transition in an emotional state of the user 112 is detected at the second electronic device 104, such information may be communicated to a connected network device, such as the first electronic device 102 or the server 106. The communication may occur continuously or periodically and the last detected transition in an emotional state of the user 112, may be reported and updated accordingly. Thus, the transitions in the emotional states of the user 112 may be monitored and continuously tracked by use of the various electronic devices, such as the first electronic device 102, the second electronic device 104, and the one or more wearable devices 108. When a primary device, such as the first electronic device 102 is in switched off state, secondary devices, such as the one or more wearable devices 108, the second electronic device 104, or other devices, may take control of emotion tracking and act accordingly based on previous usage pattern data. The server 106 may be further configured to receive information related to detected transitions in emotional states with timestamps from various electronic devices, such as the first electronic device 102, the second electronic device 104, and the one or more wearable devices 108.

In accordance with an embodiment, the first electronic device 102 may be configured to determine a level of the second emotional state of the user 112 during viewing of the first content item on the first electronic device 102. The determined level may correspond to a scale of a particular emotional state, such as from happy (scale of 5.1) to very happy (scale of 5.5) to excited or jubilated state (scale of 5.9) while the user 112 is viewing the first content item. Similarly, other detected emotional states, the level of the emotional state may be detected.

In accordance with an embodiment, the first electronic device 102 may be configured to associate a portion of the first content item viewed during the detected transition, with the second emotional state of the user 112. The portion of the first content item may be associated with the second emotional state when the determined level is greater than a threshold.

In accordance with an embodiment, the first electronic device 102 may be configured to identify a cause of the detected transition to the second emotional state in the portion of the first content item associated with the second emotional state. The identified cause in the portion of the first content item may correspond to an image frame, an object in the image frame, a context, or theme of the portion of the first content item.

In accordance with an embodiment, the first electronic device 102 may be configured to tag the identified cause in the portion of the first content item with one or more parameters. The one or more parameters may be the second emotional state, identity information of the user 112, a timestamp of the detected transition, and/or the determined level of the second emotional state. The first electronic device 102 may be configured to communicate the tagged cause in the portion from the first content item to the server 106 or a network device communicatively coupled to the first electronic device 102. An exemplary scenario is illustrated and described in FIG. 4A to further explain these features in details.

In accordance with an embodiment, the first electronic device 102 may be configured to search a product or a service related to the tagged cause associated with the second emotional state in real-time or near real-time. The search may be performed by use of a pre-specified search engine based on the tagged cause. The search related to the tagged cause may be a global search via the Internet search engine or a local search as per pre-defined settings. The first electronic device 102 may be configured to generate a recommendation for a product or service based on the identified cause in response to the detected transition in the emotional state of the user 112 and a current location of the first electronic device.

In accordance with an embodiment, the first electronic device 102 may be configured to communicate a notification to the second electronic device 104, such as a smartphone, to unlock a home screen interface of the second electronic device 104 to display the generated recommendation. Such notification may be communicated when the user 112 may move away from the first electronic device 102 or when the user 112 may not be in a direct line-of-sight of the first electronic device 102.

In accordance with an embodiment, the detected transition to the second emotional state at the first electronic device 102 may be carried to the second electronic device 104, such as a smartphone. Even before the home screen interface of the second electronic device 104 is unlocked, the second electronic device 104 may decide what content, applications, wallpaper, derivative data retrieved from the pre-installed applications, may be appropriate for the user 112 to maintain the second emotional state, detected previously at the first electronic device 102, at the second electronic device 104. Such seamless maintenance or carrying of emotional states among multiple electronic devices may occur when the last detected emotional state, such as the second emotional state, may be a positive emotion, such as happy instead of a negative emotion, such as sad.

For example, the user 112 may be viewing a cricket match on the first electronic device 102. In certain scenarios, the user 112 may need to move to another location (such as may drive a vehicle) away from the first electronic device 102. In such scenarios, the second electronic device 104 may be configured to provide recommendations or perform certain actions, such as "Run cricket commentary" on the second electronic device 104 while the user 112 is driving the vehicle", provide "cricket score alerts", via the application interface 104c. Thus, the detected transition to the second emotional state at the first electronic device 102 may be carried to the second electronic device 104, such as a smartphone.

In accordance with an embodiment, in certain scenarios, a negative emotion, such as boring, anger, sad, confused, or irritated, may be the last detected emotional state at the first electronic device 102. In such scenarios, the second electronic device 104 may decide what recommendations, content, applications, wallpaper, derivative data retrieved from the pre-installed applications, may be appropriate for the user 112 to change or influence the negative emotional state of the user 112 previously detected at the first electronic device 102. Such recommendations, content, applications, wallpaper, derivative data retrieved from the pre-installed applications may be useful to change the negative emotional state of the user 112 to a positive emotion state, such as a happy emotional state, at the second electronic device 104.

In accordance with an embodiment, the second electronic device 104, such as a smartphone, may be configured to further detect a transition in an emotional state of the user 112 associated with the second electronic device 104 from a first emotional state to a second emotional state. For the detection of the transition in the emotional state of the user 112, the second electronic device 104 may utilize data received from the one or more wearable devices 108 (such as sensor data) associated with the user 112 and/or an in-built camera, such as the image-capturing unit 104a, of the second electronic device 104. In accordance with an embodiment, the second electronic device 104 may also utilize a text-based input and/or a voice-based input on the second electronic device 104, for the detection of the transition in the emotional state of the user 112.

In accordance with an embodiment, the second electronic device 104 may be configured to identify the user 112 based on the sensor data received from the one or more wearable devices 108, by use of the in-built camera, such as the image-capturing unit 104a, and/or the received text-based input and/or the voice-based input. In accordance with an embodiment, the second electronic device 104, such as a smartphone, may be configured to retrieve a tagged content item associated with the detected second emotional state of the user 112 from a network device based on identity information of the user 112 and the detected transition. The network device may correspond to the server 106, another electronic device, such as the first electronic device 102, connected to the second electronic device 104 in a wireless home network, such as the communication network 110, and/or other subscribed cloud based service.

In accordance with an embodiment, the second electronic device 104 may be configured to search one or more products or services based on the retrieved tagged content item in the second electronic device 104. In accordance with an embodiment, the second electronic device 104 may be configured to launch an application on the second electronic device 104 to recommend at least a product or a service related to the retrieved tagged content item. The application may be launched in response to the detected transition in the emotional state of the user 112 and a current location of the second electronic device 104. An exemplary scenario is illustrated and described in FIG. 4B to further explain the feature in details.

Figure 2:
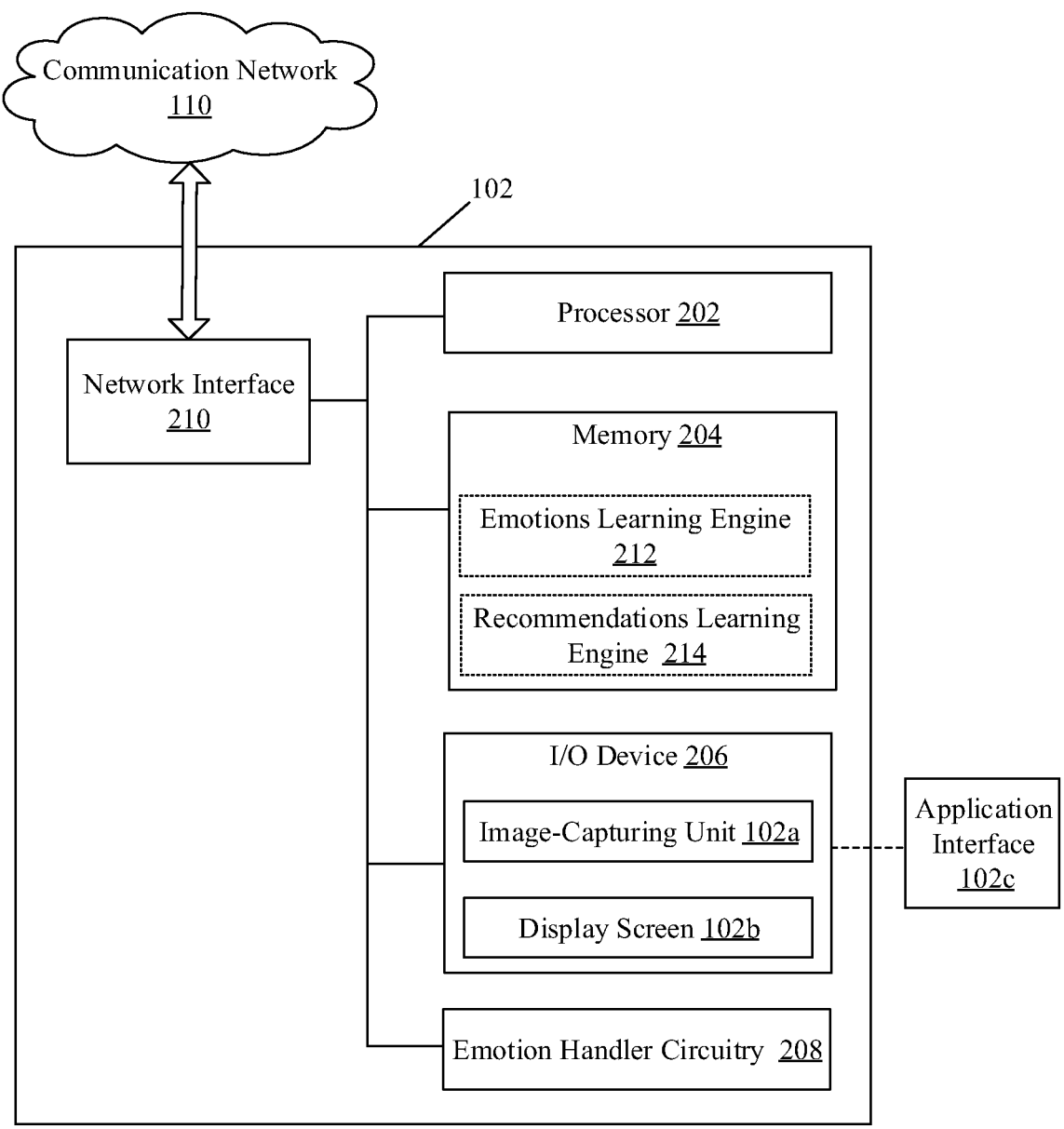
FIG. 2 illustrates a block diagram of an exemplary electronic device to provide recommendation based on emotional state detection of a user, in accordance with an embodiment of the disclosure.

FIG. 2 illustrates a block diagram of an exemplary electronic device to provide recommendation based on emotional state detection of a user, in accordance with an embodiment of the disclosure. FIG. 2 is explained in conjunction with elements from FIG. 1. With reference to FIG. 2, there is shown the first electronic device 102. The first electronic device 102 may comprise one or more processors, such as a processor 202, a memory 204, one or more input/output (I/O) devices, such as an I/O device 206, an emotion handler circuitry 208, and a network interface 210. The memory may include an emotions learning engine 212 and a recommendations learning engine 214. There is further shown the image-capturing unit 102a, the display screen 102b, and the application interface 102c in the I/O device 206.

The processor 202 may be communicatively coupled to the memory 204, the I/O device 206, the emotion handler circuitry 208, and the network interface 210. The network interface 210 may communicate with the server 106, via the communication network 110, under the control of the processor 202.

The processor 202 may comprise suitable logic, circuitry, interfaces, and/or code that may be configured to execute a set of instructions stored in the memory 204. The processor 202 may be implemented based on a number of processor technologies known in the art. Examples of the processor 202 may be an X86-based processor, X86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or control circuits.

The memory 204 may comprise suitable logic, circuitry, and/or interfaces that may be configured to store a machine code and/or a set of instructions executable by the processor 202. The memory 204 may be further configured to store captured images or video of the user 112 and sensor data received from the one or more wearable devices 108. The memory 204 may be further configured to store the application interface 102c, and various data, functions, and training dataset associated with the emotions learning engine 212 and the recommendations learning engine 214. The memory 204 may be further configured to store operating systems and associated applications. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to receive an input from the one or more users, such as the user 112. The I/O device 206 may be further configured to provide an output to the one or more users. The I/O device 206 may comprise various input and output devices that may be operable to communicate with the processor 202. Examples of the input devices may include, but are not limited to, the image-capturing unit 102a, a touch screen, a keyboard, an infrared sensor, a mouse, a joystick, a microphone, a motion sensor, a light sensor, one or more sensors, such as a geospatial location detection sensor, and/or a docking station. Examples of the output devices may include, but are not limited to, the display screen 102b, a projector screen, and/or a speaker.

The emotion handler circuitry 208 may comprise suitable logic, circuitry, and/or interfaces that may be configured to process the one or more images or video captured by the image-capturing unit 102a. The emotion handler circuitry 208 may be further configured to process the sensor data received from the one or more wearable devices 108 associated with the user 112 to detect a transition in an emotional state of the user 112. The emotion handler circuitry 208 may be configured to continuously detect transitions in emotional states of the user 112 based on the processing of the captured one or more images, video and/or the sensor data. The emotion handler circuitry 208 may be further configured to identify a cause of the detected transition to the second emotional state in a certain portion of a content item, such as certain image frames, associated with the second emotional state.

In accordance with an embodiment, the emotion handler circuitry 208 may be a part of the processor 202. Alternatively, the emotion handler circuitry 208 may be implemented as a separate processor or circuitry in the first electronic device 102. In accordance with an embodiment, the emotion handler circuitry 208 and the processor 202 may be implemented as an integrated processor or a cluster of processors that perform the functions of the emotion handler circuitry 208 and the processor 202. In accordance with an embodiment, the emotion handler circuitry 208 may be implemented as a set of instructions stored in the memory 204, which on execution by the processor 202 may perform the functions of the first electronic device 102.

The network interface 210 may comprise suitable logic, circuitry, interfaces, and/or code that may be configured to communicate with the second electronic device 104, the one or more wearable devices 108, and the server 106, via the communication network 110 (as shown in FIG. 1). The network interface 210 may implement known technologies to support wired or wireless communication of the first electronic device 102 with the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 210 may communicate via wired or wireless communication with the communication network 110. The wireless communication may use one or more of the communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Long-Term Evolution (LTE), Wireless Fidelity (Wi-Fi) (such as IEEE 802.11a, IEEE 802.11b, IEEE 802.11g and/or IEEE 802.11n), Light-Fidelity (Li-Fi), voice over Internet Protocol (VoIP), Wi-MAX, a protocol for email, instant messaging, and/or Short Message Service (SMS).

The emotions learning engine 212 may be machine learning model that may be configured to categorize different emotions of a human subject, such as the user 112, in one of the plurality of emotional states 114. In accordance with an embodiment, the emotions learning engine 212 may be a classifier trained based on historical data. Examples of one or more techniques that may be utilized to train the classifier or the emotions learning engine 212 include, but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Forest (RF) Classifier.

In accordance with an embodiment, in the training stage, the plurality of emotional states 114 may be assigned a numeric value, by use of the emotions learning engine 212. For example, the emotions may be classified into one of the plurality of emotional states 114, such as "0=neutral, 1=anger, 2=contempt, 3=disgust, 4=fear, 5=happy, 6=sadness, 7=surprise. Each of the plurality of emotional states 114 may be further sub-classified into various levels, such as 5.1, 5.2, 5.3, . . . , 5.9 may represent an level (or a scale) of happiness, where 5.1 may denote happy and 5.9 may denote highest level of happiness, such as excited, in that order. Similarly, 1.9 may denote very angry. To detect various emotions, such as happy emotions, sad emotions, or angry emotions, the emotions learning engine 212 may be previously trained.

The recommendations learning engine 214 may be another machine learning model that may be configured to update generated recommendation based on a machine learning associated with a usage pattern of the generated recommendation by the user 112, in the first electronic device 102. Examples of one or more techniques that may be utilized to train the recommendations learning engine 214 may include, but are not limited to, a linear regression based method, a neural network, a Bayesian network, a support vector machine (SVM), a decision tree-based method, and/or a nearest neighbors based method.

In operation, the processor 202 may be configured to capture one or more images or a video of the user 112 who may be viewing a content item on the first electronic device 102, by use of the image-capturing unit 102a. The emotion handler circuitry 208 may be configured to continuously monitor physiological and/or behavioral characteristics of the user 112 while the user 112 is viewing the content item. In accordance with an embodiment, the physiological and/or behavioral characteristics of the user 112 may correspond to facial expressions, a movement of hands or face, a user sitting position, a body posture, and/or a voice pattern. Such physiological and/or behavioral characteristics of the user 112 taken either alone or in combination may provide an increased precision in detection of the current emotional state of the user 112. The physiological and/or behavioral characteristics of the user 112 may be monitored based on an analysis of the captured one or more images or the video of the user 112.

In accordance with an embodiment, the processor 202 may be configured to receive the sensor data from the one or more wearable devices 108 to monitor or track physiological and/or behavioral characteristics of the user 112. The senor data may correspond to measurement values of various human physiological parameters, such as blood pressure, perspiration, heart rate, body temperature, and the like. For instance, a sad or anxiety emotional state detected based on the analysis of the one or more factors by use of the image processing techniques coupled with a high perspiration rate may confirm a high anxiety level.

In accordance with an embodiment, the emotion handler circuitry 208 may be configured to detect a transition in an emotional state of the user 112 from a first emotional state, such as neutral, to a second emotional state, such as happy, angry, or excited. The first emotional state and the second emotional state may correspond to the plurality of the emotional states 114.

In accordance with an embodiment, the emotion handler circuitry 208 may be configured to detect different transitions in the emotional states of the user 112 from the neutral to other peak emotions, such as sad, anger, contempt, fear, surprise, confused, tender, during viewing of the content item on the first electronic device 102. For example, a first transition in the emotional state of the user 112 from a neutral emotional state to a happy emotional state may be detected at a first time instance. Similarly, a second transition in the emotional state of the user 112 from a neutral emotional state to an angry emotional state may be detected at a second time instance during viewing of the content item. In accordance with an embodiment, a plurality of users may be simultaneously viewing the content item on the first electronic device 102. In such an embodiment, the emotion handler circuitry 208 may be configured to simultaneously monitor emotions and detect transitions in the emotional states of the plurality of users viewing the content item on the first electronic device 102. For example, the plurality of users may have a group discussion. The emotion handler circuitry 208 may be configured to simultaneously monitor emotions and detect transitions in the emotional states based on a recorded audio of the group discussion and/or based on physiological parameters captured from the one or more wearable devices 108 associated with the each user in the group. Thereafter, recommendation may be generated in accordance to the detected transitions and may displayed in a common media screen, such as a TV or a display device, or may be communicated to individual devices, such as a smart-watch or a smart-phone associated with each user in the group.

In accordance with an embodiment, the emotion handler circuitry 208 may be configured to determine a level of the second emotional state of the user 112 during viewing of the content item on the first electronic device 102. The determined level may correspond to a scale of a particular emotional state, such as from happy to very happy to excited or jubilated state while the user 112 is viewing the content item 102. The determined level may correspond to a scale (such as "n.1 to n.9", where n=a numeric identifier for a particular detected emotional state), of a particular emotional state, such as from happy (scale of 5.1) to very happy (scale of 5.5) to excited or jubilated state (scale of 5.9) while the user 112 is viewing the first content item. Similarly, other detected emotional states, the level of the emotional state may be detected. For instance, different levels for sad emotion may be scaled as 6.1 (that represents a bored state), 6.2 to 6.3 (a sad state), a 6.4 to 6.6 (a very sad state), and 6.7 to 6.9 (extreme grief and sorrow).

In accordance with an embodiment, the emotion handler circuitry 208 may be configured to associate a portion of the content item viewed during the detected transition, with the second emotional state of the user 112. The portion of the content item may be associated with the second emotional state when the determined level is greater than a threshold.

In accordance with an embodiment, the emotion handler circuitry 208 may be configured to identify a cause of the detected transition to the second emotional state in the portion of the content item associated with the second emotional state. The identified cause in the portion of the first content item may correspond to an image frame, an object in the image frame, a context, or theme of the portion of the content item. In other words, what is the real or exact cause of the detected transition to the second emotional state, such as excited emotional state, in the viewed content, may be identified. The watched content may be analysed based on image processing to identify one or more objects in an image frame from the portion which triggered the emotional state transition. For example, one person watching a "James Bond" movie may be excited to see an object, such as "a smartphone or Omega watch", whereas another person watching the same "James Bond" movie may become excited to see a product of certain manufacturer brand, such as "globe-trotter" bags or a camera.

In accordance with an embodiment, the processor 202 may be configured to tag the identified cause in the portion of the content item with one or more parameters. The one or more parameters may be the second emotional state, identity information, such as a user ID, of the user 112, a timestamp of the detected transition, and/or the determined level of the second emotional state. The processor 202 may be configured to communicate the tagged cause (or tagged content related to the second emotional state) in the portion from the content item to the server 106 or a network device communicatively coupled to the first electronic device 102, via the network interface 210.

In accordance with an embodiment, the processor 202 may be configured to search a product or a service related to the tagged cause associated with the second emotional state in real-time or near real-time. The search may be performed by use of a pre-specified search engine based on the tagged cause. The search related to the tagged cause may be a global search via an Internet search engine or a local search as per pre-defined settings.

In accordance with an embodiment, the processor 202 may be configured to generate a recommendation for a product or service based on the identified cause in response to the detected transition in the emotional state of the user 112 and a current location of the first electronic device 102. The processor 202 may be configured to control display of the generated recommendation for the product or the service on the first electronic device 102 or another electronic device, such as the second electronic device 104, communicatively coupled to the first electronic device 102. In accordance with an embodiment, the processor 202 may be configured to update the generated recommendation by use of the recommendations learning engine 214, based on a machine learning associated with a usage pattern of the generated recommendation.

In accordance with an embodiment, the detected transition to the second emotional state at the first electronic device 102 may be carried to the second electronic device 104, such as a smartphone. Even before the home screen interface of the second electronic device 104 is unlocked, the second electronic device 104 may decide what content, applications, wallpaper, derivative data retrieved from the pre-installed applications, may be appropriate for the user 112 to maintain the second emotional state, detected previously at the first electronic device 102, at the second electronic device 104. Such seamless maintenance or carrying of emotional states among multiple electronic devices may occur when the last detected emotional state, such as the second emotional state, may be a positive emotion, such as happy instead of a negative emotion, such as sad.

In accordance with an embodiment, the processor 202 may be configured to dynamically change display of a content item currently displayed on the first electronic device 102 based on the detection of a transition of an emotional state of the user 112. For example, the user 112 may be viewing a movie on the first electronic device 102, such as a TV. The first electronic device 102 may detect that the user 112 transitions from a neutral emotional state to a sad emotional state, such as the user 112 may become bored watching the movie. In such a scenario, the first electronic device 102 may automatically play another movie suitable to overcome the sad emotional state. Similarly, when the user 112 is identified as feeling sleepy, the first electronic device 102 may automatically turn-off itself. Alternatively, when the user 112 is detected in excited emotional state, an excited moment may be shared on a social network profile of the user 112. This may be referred to as a "Kando" experience that is the emotional connect with the user 112 as provided by the first electronic device 102.

In another example, the user 112 may be viewing the movie on the first electronic device 102, such as the TV. The first electronic device 102 may detect that the user 112 transitions from a neutral or sad emotional state to a positive emotional state, such as the happy emotional state. In such a scenario, the first electronic device 102 may automatically change home screen of multiple other devices, such as the second electronic device 104, associated with the user 112. For instance, the home screen change action may be simultaneously applied to currently operated devices or active devices, such as a smart-watch, a smartphone, or any other active and in-use devices associated with the user 112.

In accordance with an embodiment, the generation and display of the recommendations for a product or service based on the identified cause in response to the detected transition in the emotional state of the user 112, may be controlled based on a selected mode. A user, such as the user 112, may select a particular mode from a plurality of modes on an electronic device, such as the first electronic device 102, by use of the application interface 102c rendered on the display screen 102b. The plurality of modes may include a fun mode, a health mode, a peace mode, or a normal mode. The fun mode may refer to a configuration setting related to generation of fun related recommendations as desired by the user 112. For example, a joke application icon linked to a jokes application may be rendered on the display screen 102b, which may be suitable for the sad emotional state. The health mode may refer to generation of recommendations that aids in maintenance of good health or promotes good health. For example, the processor 202 may be configured to generate a recommendation to solve certain puzzle games to promote active state of mind of the user 112. This may occur in an event a bored emotional state is detected. In another example, different motivational quotes may be displayed on the home screen of the first electronic device 102. In accordance with an embodiment, the categories of quotes displayed may also change dynamically based on the determined level of a particular emotional state, such as sad emotional state. A different category of quotes may be displayed for a different level, such as scale of 6.1 (bored state) to 6.9 (extreme grief state). The peace mode may refer to generation of recommendations that attempts to calm an angry person and provides a relaxing experience. For example, the processor 202 may be configured to generate a recommendation to play soft music (such as melody songs) and display certain options of the soft music to be played on the first electronic device 102. This may occur in an event an angry emotional state is detected, so as to calm down the user 112 to a peaceful state. The normal mode is a default mode to generate recommendation of all types independent of a user-specified controlled mode, such as the fun mode, the peace mode, and the normal mode. Various other examples of generation of recommendations in different emotional states are further described in details in FIGS. 5A and 5B.

In accordance with an embodiment, the functionalities or operations performed by the first electronic device 102, as described in FIG. 1 may performed by the processor 202 and/or the emotion handler circuitry 208. Other operations performed by the processor 202 and/or the emotion handler circuitry 208 may be understood from the description in the FIGS. 4A, 7A, and 7B.

Figure 3:
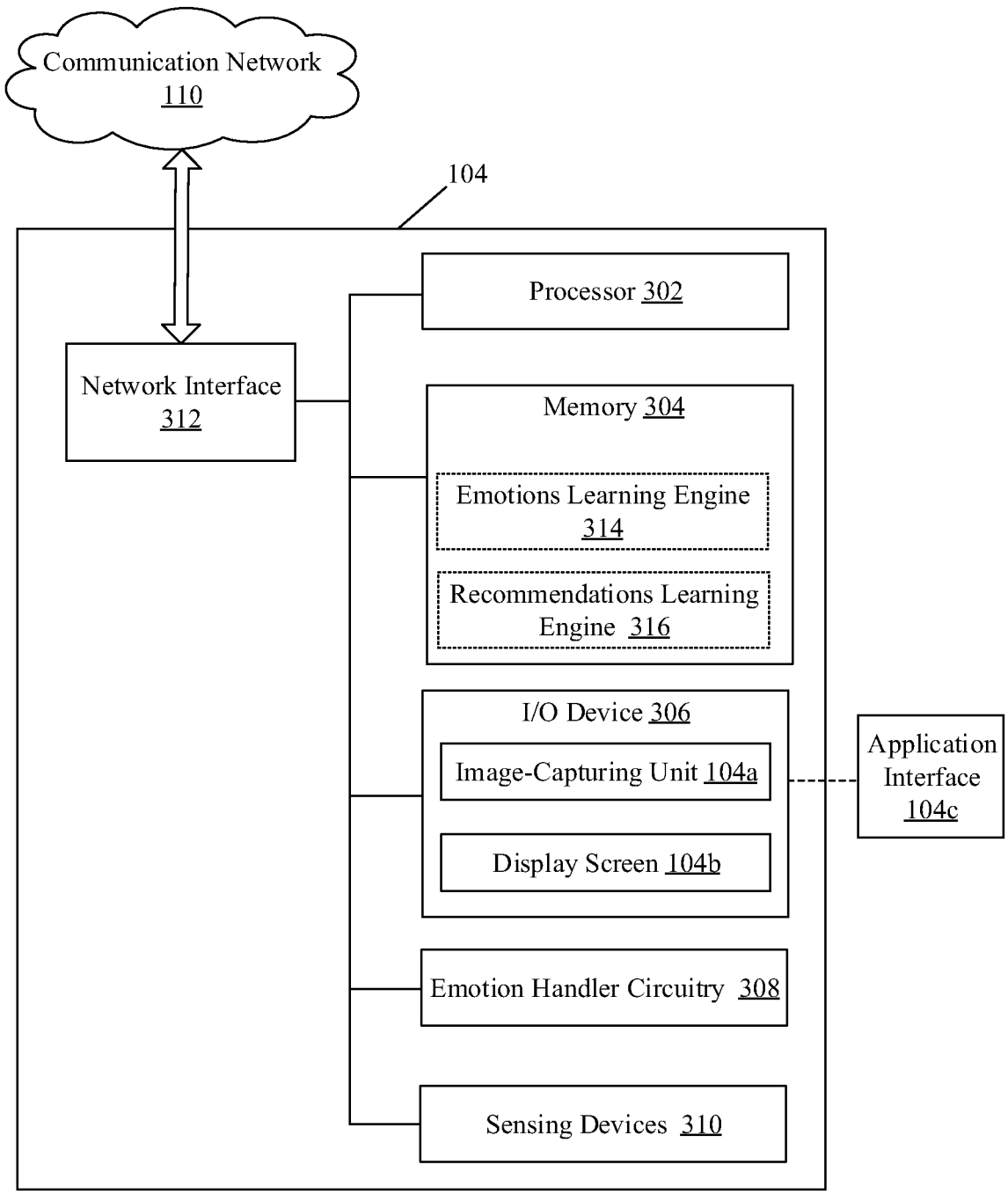
FIG. 3 illustrates a block diagram of another exemplary electronic device to provide recommendation based on emotional state detection of a user, in accordance with an embodiment of the disclosure.

FIG. 3 illustrates a block diagram of another exemplary electronic device to provide recommendation based on emotional state detection of a user, in accordance with an embodiment of the disclosure. FIG. 3 is explained in conjunction with elements from FIGS. 1 and 2. With reference to FIG. 3, there is shown the second electronic device 104. The components of the second electronic device 104 may be similar to that of the first electronic device 102. The second electronic device 104 may comprise one or more processors, such as a processor 302, a memory 304, one or more input/output (I/O) devices, such as an I/O device 306, an emotion handler circuitry 308, sensing devices 310, and a network interface 312. The memory 304 may include an emotions learning engine 314 and a recommendations learning engine 316. There is further shown the image-capturing unit 104a, the display screen 104b, and the application interface 104c in the I/O device 206.

The processor 302 may be communicatively coupled to the memory 304, the I/O device 306, the emotion handler circuitry 308, the sensing devices 310, and the network interface 312. The network interface 312 may communicate with a network device, such as the first electronic device 102, via the communication network 110, under the control of the processor 202.

The processor 302 may comprise suitable logic, circuitry, interfaces, and/or code that may be configured to execute a set of instructions stored in the memory 304. Implementation examples of the processor 302 may be similar to that of the processor 202. The memory 304 may comprise suitable logic, circuitry, and/or interfaces that may be configured to store a machine code and/or a set of instructions executable by the processor 302. The memory 304 may be further configured to store the application interface 104c associated with a pre-installed application and the emotions learning engine 314. The memory 304 may be further configured to store operating systems and associated applications. Implementation examples of the memory 304 may be similar to that of the memory 204.

The I/O device 306 may comprise suitable logic, circuitry, interfaces, and/or code that may be configured to receive an input from the one or more users, such as the user 112. The I/O device 306 may be further configured to provide an output to the one or more users. Examples of the input devices may include, but are not limited to, the image-capturing unit 104a, a touch screen, a keyboard, an infrared sensor, a mouse, a microphone, a motion sensor, a light sensor, and/or a docking station. Examples of the output devices may include, but are not limited to, the display screen 104b, a projector screen, and/or a speaker.

The emotion handler circuitry 308 may comprise suitable logic, circuitry, and/or interfaces that may be configured to process the one or more images or video captured by the image-capturing unit 104a. The emotion handler circuitry 308 may be implemented similar to that of the emotion handler circuitry 208.

The sensing devices 310 may comprise one or more sensors that include a suitable logic, circuitry, interfaces, and/or code to detect physical or quantitative attributes and provide corresponding output as sensor data. The physical or quantitative attributes may include, but are not limited to, an orientation, motion, contact, proximity, geo-magnetic field, indoor positioning, and/or ambient lighting. The one or more sensors in the sensing devices 310 may be configured to detect a geo-location of the second electronic device 104. Examples of the one or more sensors may include, but are not limited to, an accelerometer, a global positioning system (GPS) sensor, an indoor positioning system, a compass or magnometer, an ambient light sensor, a tricorder, a gyroscope, a proximity sensor, an image sensor, a lux meter, a touch sensor, and/or an infrared sensor.

The network interface 312 may comprise suitable logic, circuitry, interfaces, and/or code that may be configured to communicate with the first electronic device 102, the one or more wearable devices 108, and the server 106, via the communication network 110 (as shown in FIG. 1). The network interface 312 may implement known technologies to wireless communication similar to that of the network interface 210.

The emotions learning engine 314 may be a machine learning model that may be configured to categorize different emotions of a human subject, such as the user 112, in one of the plurality of emotional states 114. The emotions learning engine 314 may be similar to that of the emotions learning engine 212 (FIG. 2) of the first electronic device 102.

The recommendations learning engine 316 may be another machine learning model that may be configured to generate or update generated recommendation based on a machine learning associated with a usage pattern of the generated recommendation by the user 112, in the second electronic device 104. The emotion handler circuitry 308 may be configured to continuously machine learn transitions or changes in emotion states of the user 112 in operations to improvise generation of recommendations and user experience related to customization of the home screen interface of the second electronic device 104 for future. The recommendations learning engine 316 may be similar to that of the recommendations learning engine 214 of the first electronic device 102 (FIG. 2).

In operation, the processor 302 may be configured to receive one or more images or a video of the user 112 by use of an in-built camera, such as the image-capturing unit 104a, of the second electronic device 104. The emotion handler circuitry 308 may be configured to monitor emotions of the user 112 based on an analysis of physiological and/or behavioral characteristics of the user 112 in the received one or more images or a video of the user 112. In accordance with an embodiment, the emotion handler circuitry 308 may be configured to utilize the emotions learning engine 314 to monitor emotions of the user 112 for improved accuracy.

In accordance with an embodiment, the processor 302 may be configured to receive sensor data from the one or more wearable devices 108, via the network interface 312. The one or more wearable devices 108 may be communicatively coupled to the second electronic device 104. The received sensor data of the user 112, such as heart rate or perspiration values, may be utilized for the detection of the transition in the emotional state of the user 112. Further, in accordance with an embodiment, the processor 302 may also utilize a text-based input and/or a voice-based input on the second electronic device 104 for the detection of the transition in the emotional state of the user 112.

In accordance with an embodiment, the emotion handler circuitry 308 may be configured to detect a transition in an emotional state of the user 112 associated with the second electronic device 104 from a first emotional state to a second emotional state. The processor 302 may be configured to identify the user 112 based on the sensor data received from the one or more wearable devices 108, the received one or more images or video of the user 112, and/or the received text-based input and/or the voice-based input.

In accordance with an embodiment, the processor 302 may be configured to retrieve a tagged content item associated with the detected second emotional state of the user 112 from a network device, via the network interface 312. The tagged content item associated with the detected second emotional state may be retrieved based on identity information of the user 112 and the detected transition. The network device may correspond to the server 106, another electronic device, such as the first electronic device 102, connected to the second electronic device 104 in a wireless home network, such as the communication network 110, and/or other subscribed cloud based service.

In accordance with an embodiment, the processor 302 may be configured to search one or more products or services based on the retrieved tagged content item in the second electronic device 104. In accordance with an embodiment, the processor 302 may be configured to launch an application on the second electronic device 104 to recommend at least a product or a service related to the retrieved tagged content item. The application may be launched in response to the detected transition in the emotional state of the user 112 and a current location of the second electronic device 104.

In accordance with an embodiment, based on the detected transition in the emotional state of the user 112, the recommendations may be generated not only for a product related to the retrieved tagged content item, but also for various services, or to provide relevant information for real-time or near real-time assistance of the user 112. For example, the user 112 may be traveling from a first city to a second city. The user 112 may find a highway closed for a maintenance work. The user 112 may unlock the second electronic device 104, such as a smartphone. Upon unlock, the emotional state of the user 112 may be recognized as "confused". In such a scenario, the home screen or the application interface 104c of the second electronic device 104 may generate and provide certain recommendations which may add value and enhance user experience. An example of the generated recommendations by use of the recommendations learning engine 316, may be "Tap to call "Mr. X" as he recently crossed this area". "Mr. X" may be a friend of the user 112 detected from a social network profile of the user 112 from a social network application and the mobile number may be retrieved from contacts application. Another recommendation may be "Mr. A" and "Mr. B" (friends) have their residential place located nearby, please consult them to guide you". Another recommendation or action may be display of a maps application with pre-loaded alternative routes. For the same emotional state, the recommendations may vary based on the previous user experience, usage pattern, and new learnings based on an input received from a network device or a cloud-based service, such as the server 106.

In accordance with an embodiment, the processor 302 of the second electronic device 104 may be configured to dynamically customize a home screen interface of the second electronic device 104. The home screen interface may be customized based on the detected transition in the emotional state of the user 112 and a last tagged content item associated with the second emotional state in the network device, such as the first electronic device 102. For example, the second electronic device 104 may be configured to automatically change wallpapers on the home screen interface based on the detected transition in the emotional state of the user 112 and recent actions on network devices, such as the first electronic device 102. Recent actions for example may be web browsing, TV watching etc.

In accordance with an embodiment, based on the detected current emotional state of user 112, such as anger, or happy, and previous machine learned user experience, by use of the recommendations learning engine 316, phone contacts applications, maps, social network applications may be pre-loaded with relevant data. Thus, not only a user interface is customized for applications, data associated with the applications may also be analyzed, arranged, and/or customized as per the detected current emotional state of user 112. An exemplary scenario is illustrated and described in FIGS. 5A and 5B to further explain these features in details.

In accordance with an embodiment, the functionalities or operations performed by the second electronic device 104, as described in FIG. 1 may be performed by the processor 302 and/or the emotion handler circuitry 308. Other operations performed by the processor 302 and/or the emotion handler circuitry 308 may be understood from the description in the FIGS. 4B, 5A, 5B, and 6.

Figure 4A:
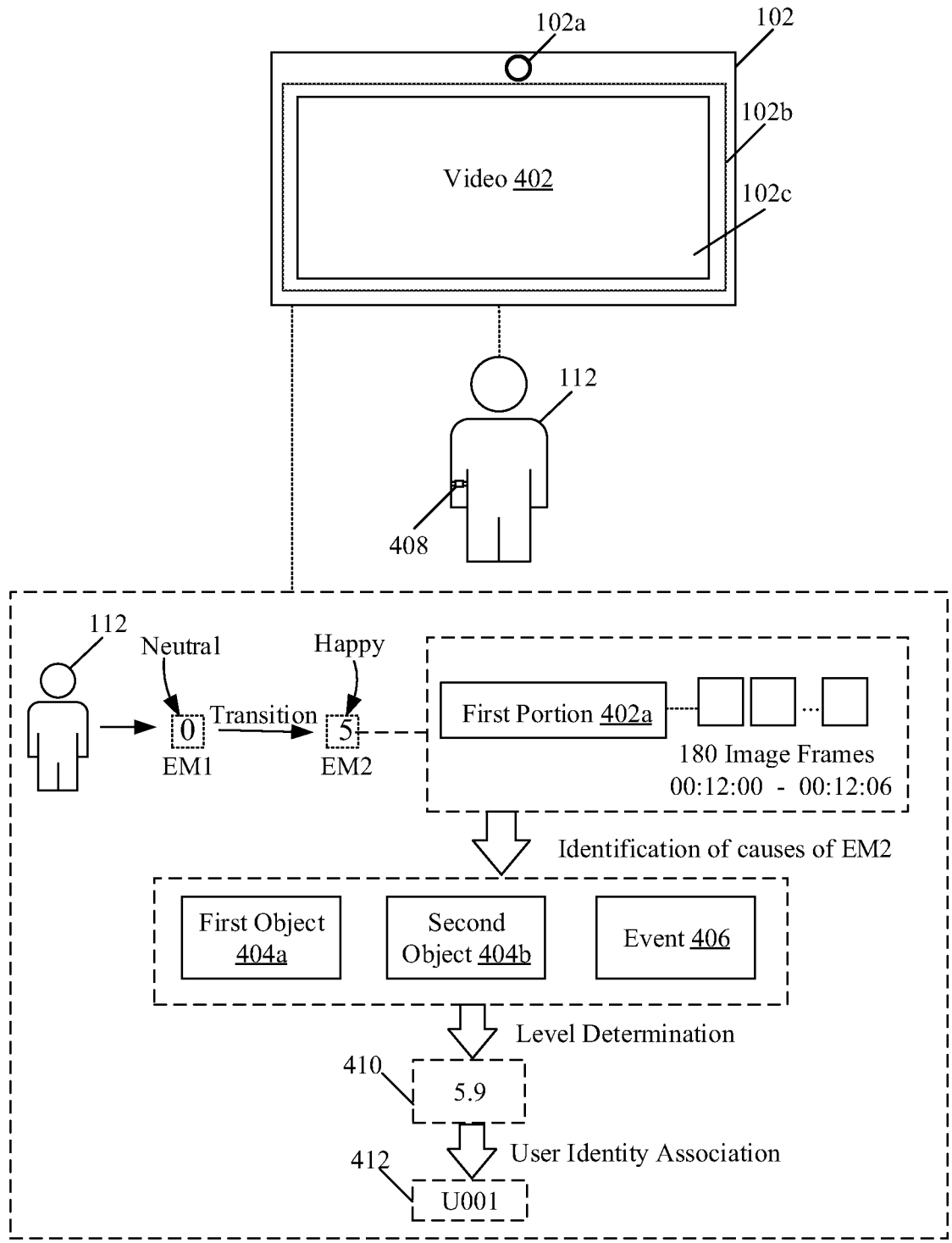
FIGS. 4A and 4B, collectively, illustrate a first exemplary scenario for implementation of the disclosed system and method to provide recommendation on an electronic device based on emotional state detection, in accordance with an embodiment of the disclosure.
Figure 4B:
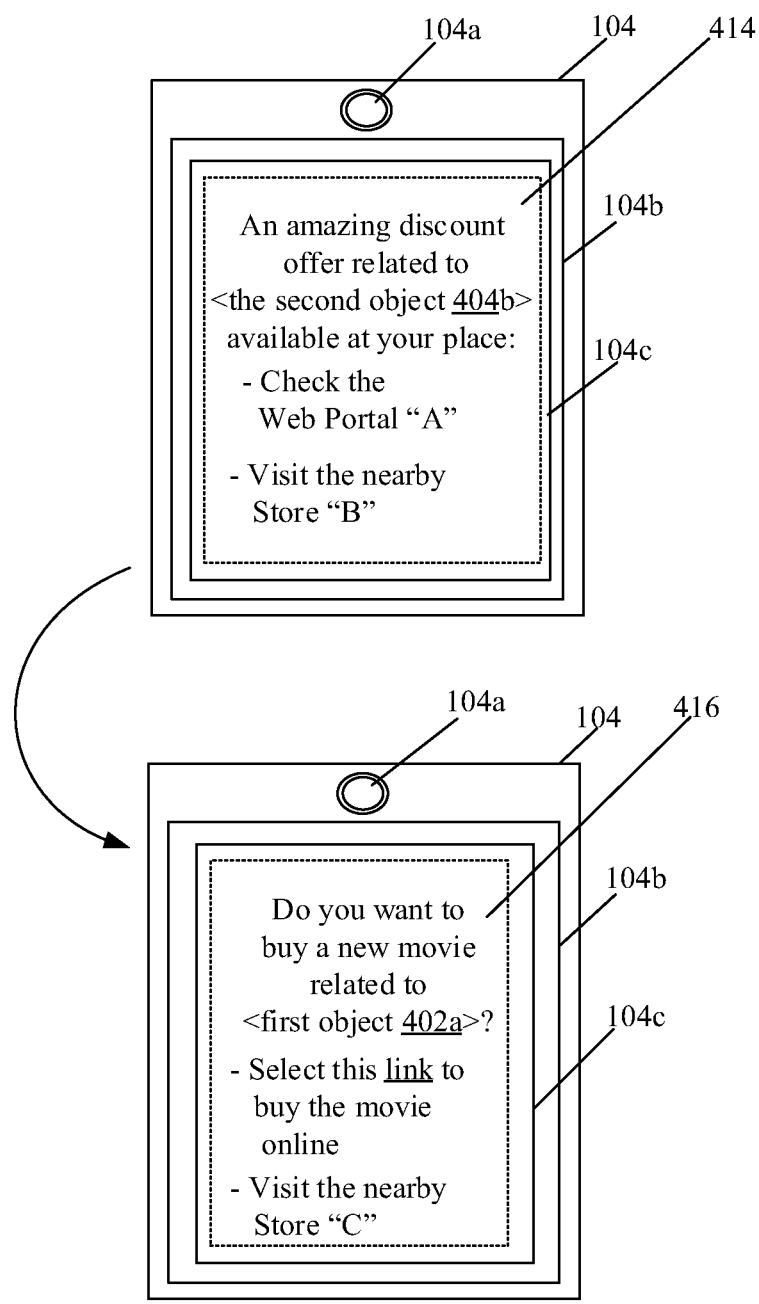

FIGS. 4A and 4B, collectively, illustrate a first exemplary scenario for implementation of the disclosed system and method to provide recommendation on an electronic device based on emotional state detection, in accordance with an embodiment of the disclosure. FIGS. 4A and 4B are explained in conjunction with elements from FIGS. 1, 2, and 3. With reference to FIG. 4A, there is shown the first electronic device 102, such as a TV, with the image-capturing unit 102a, the display screen 102b and the application interface 102c. There is further shown a content item, such as a video 402, rendered on the display screen 102b, via the application interface 102c. There is further shown a first portion 402a of the video 402. There is further shown a first object 404a, a second object 404b, and an event 406 as possible identified causes of excited emotional state of the user 112. There is also shown a smart band 408 associated with the user 112, a level 410, and a user identifier (ID) 412.

In accordance with the first exemplary scenario, the first electronic device 102 may be a smart TV or a tablet device. The smart band 408 may correspond to the one or more wearable devices 108. The user 112 may be viewing the video 402 on the first electronic device 102. The video 402 may be played via the application interface 102c, such as a browser, of the first electronic device 102.

In accordance with an embodiment, a video of the user 112 may be captured by the image-capturing unit 102a. In accordance with an embodiment, the emotion handler circuitry 208 of the first electronic device 102 may be configured to receive sensor data from the smart band 408. The emotion handler circuitry 208 may be configured to detect a transition in an emotional state of the user 112 from a first emotional state, such as a neutral emotional state "0", to a second emotional state, such as happy emotional state "5". The transition to the second emotional state of the user 112 viewing the video 402 on the first electronic device 102 may be detected between a playback time of 12 minutes and 2 seconds "00:12:02" to 12 minutes and 4 seconds "00:12:04" of the video 402. The content played on the first electronic device 102 at the time of detection of the transition in the emotional state of the user 112, may be useful to identify the cause of the detected transition in a certain portion, such as the first portion 402a of the video 402.

A pre-determined time period, such as 2 seconds, prior and after the detection of the transition to the second emotional state, may be taken into consideration for further analysis to identify the cause of the detected transition. Accordingly, the first portion 402a of the video 402 that may start from the timestamp "00:12:00" to "00:12:06" (as shown) and may include a sequence of "180" image frames, may be used for analysis purpose. The first portion 402a of "180" image frames may be associated with the numeric value "5" that may represent the detected happy emotional state. Further, the emotion handler circuitry 208 may be configured to determine the level 410, such as a numeric value of "5.9" of the second emotional state, such as the happy emotional state, of the user 112. The level 410 in the scale of "5.9" may indicate an excited or jubilated state of the user 112 while viewing the first portion 402a of the video 402. The first portion 402a of the video 402 may be associated with excited emotional state when the determined level 410 is greater than a threshold.

In accordance with an embodiment, the emotion handler circuitry 208 of the first electronic device 102 may be configured to identify the first object 404a, the second object 404b, and the event 406 (such as a context) as the possible causes in the first portion 402a. The first object 404a may be a human character, such as a famous personality "James bond", in the video 402. The second object 404b may be a camera of a certain manufacturer brand, held by the human character. The event 406 may refer to certain action scenes, such as a fight scene, using the second object 404b, such as the camera.

In accordance with an embodiment, the processor 202 of the first electronic device 102 may be configured to tag the identified causes, such as the first object 404a, the second object 404b, and the event 406, and/or one or more image frames of the first portion 402a of the video 402 with one or more parameters. The one or more parameters may be the excited emotional state, the determined level 410, such as "5.9", identity information, such as the user ID 412, of the user 112, and/or a timestamp of the detected transition.

In accordance with an embodiment, the processor 202 of the first electronic device 102 may be configured to communicate the tagged content (such as the first object 404a, the second object 404b, and the event 406 (may be a metadata), and/or one or more image frames of the first portion 402a) to a network device. The network device may be a cloud server, such as the server 106 or a network device communicatively coupled to the first electronic device 102.

In accordance with an embodiment, the first electronic device 102 may be configured to generate a recommendation for a product or service based on the identified cause in response to the detected transition in the emotional state of the user 112. For example, a subsequent advertisement displayed on the first electronic device 102, such as the TV or the tablet device, may be related to the second object 404b, such as the camera of the manufacturer brand, the sight of which caused or triggered excitement to the user 112.

In accordance with an embodiment, instead of generating the recommendation, the first electronic device 102 may be configured to automatically display another video related to the event 406 or the first object 404a. Further, in accordance with an embodiment, the first electronic device 102 may be configured to share the excited moment, such as "feeling excited watching this video" along with the first portion 402a on a social profile associated with the user 112. The sharing may be performed based on a result of the recommendations learning engine 316, based on previous actions of the user 112 under a similar scenario, such as when the user 112 became excited while watching a certain video on the first electronic device 102 in recent past. In accordance with an embodiment, the end consumer of the generated recommendation may be the second electronic device 104. In such an embodiment, the recommendations may not be generated on the first electronic device 102.

With reference to 4B, there is shown the second electronic device 104 with the image-capturing unit 104a, the display screen 104b, and the application interface 104c. There is further shown a first recommendation 414 and a second recommendation 416 related to the first object 404a and the second object 404b, on the application interface 104c.

In accordance with the first exemplary scenario, the second electronic device 104 may be a smartphone. The user 112 may move away from the first electronic device 102 that may be located in a first location. For example, the user 112 needs to visit a second location, such as a friend's home, or a new city, after a certain time period, such as a few days or a month, of watching the video 402 (FIG. 4A).

In accordance with an embodiment, the emotion handler circuitry 308 of the second electronic device 104, such as the smartphone, may be configured to detect a transition in an emotional state of the user 112 associated with the second electronic device 104 from a first emotional state, such as a neutral, to the second emotional state, such as excited. The second electronic device 104 may utilize data received from the smart band 408 associated with the user 112 and/or an in-built camera, such as the image-capturing unit 104a, of the second electronic device 104 for the detection of the transition in the emotional state of the user 112.

In accordance with an embodiment, the second electronic device 104 may be configured to identify the user 112, such as the user ID 412 "U001", based on the data received from the smart band 408, the image-capturing unit 104a, and/or the received text-based input and/or the voice-based input. In accordance with an embodiment, the processor 302 of the second electronic device 104, such as a smartphone, may be configured to retrieve one or more tagged content items associated with the detected second emotional state of the user 112 from a network device, such as the server 106. The one or more tagged content items, such as the first object 404a and/or the second object 404b, may be retrieved based on identity information, such as the user ID 412 "U001", of the user 112 and the detected transition to the second emotional state, such as excited emotional state.

In accordance with an embodiment, the processor 302 of the second electronic device 104 may be configured to search one or more products or services based on the retrieved one or more tagged content items, such as the first object 404a and/or the second object 404b, in the second electronic device 104. The processor 302 of the second electronic device 104 may be configured to launch an application, such as the application interface 104c, on the second electronic device 104 to recommend at least a product or a service related to the retrieved tagged content item. For example, the first recommendation 414 may be rendered via the application interface 104c of the launched application. The first recommendation may be an advertisement, such as a discount offer related to the retrieved second object 404b, such as the camera of the manufacturer brand "X", at a nearby establishment or a store "B" in the vicinity of the current location, such as the second location, of the second electronic device 104, as shown. The application may be launched in response to the detected transition in the emotional state of the user 112 to the excited emotional state.

In another example, the second recommendation 416 may be rendered via the application interface 104c of the launched application. The second recommendation may be an advertisement or a piece of emotion-based recommendation or relevant information related to the retrieved tagged content item, such as the first object 404a, in the current location of the second electronic device 104. An emotion-based recommendation, such as "Do you want to buy a new movie related to <first object 404a>, such as the human character "James Bond" may be generated and rendered via the application interface 104c. A link to an online web portal available at the current location of the second electronic device 104 or a map to a nearby physical store "C" in the vicinity of the current location, such as the second location, of the second electronic device 104, may also be rendered, as shown.

Figure 5A:
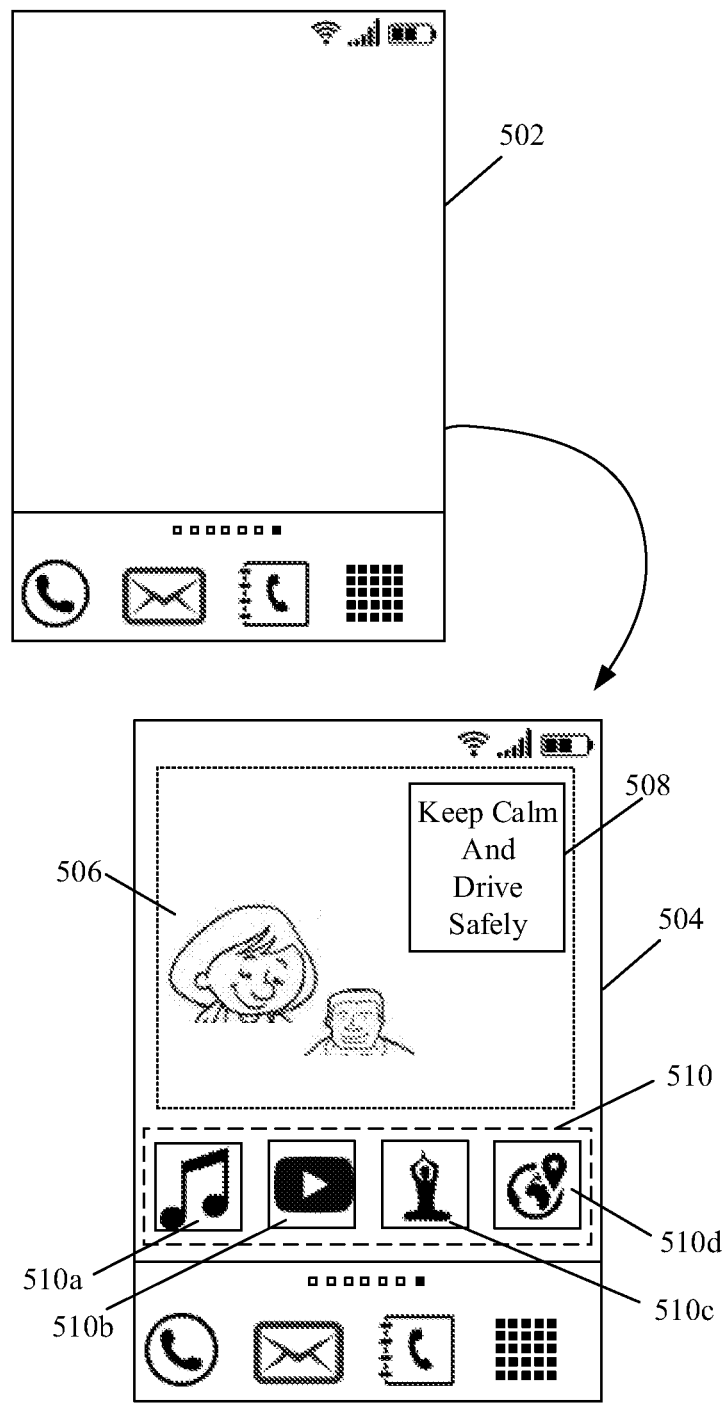
FIGS. 5A and 5B, collectively, illustrate a second exemplary scenario for implementation of the disclosed system and method to provide recommendation on an electronic device based on emotional state detection, in accordance with an embodiment of the disclosure.
Figure 5B:
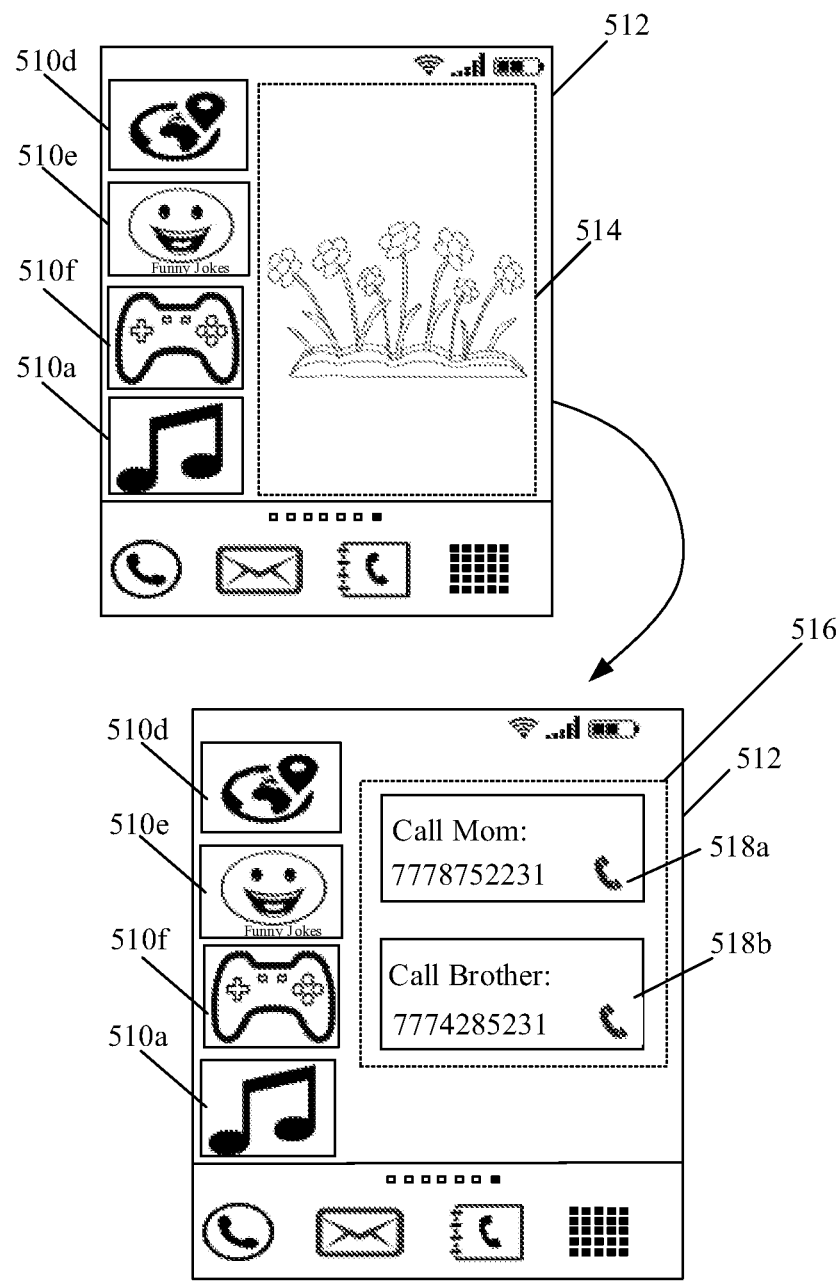

FIGS. 5A and 5B, collectively, illustrate a second exemplary scenario for implementation of the disclosed system and method to provide recommendation on an electronic device based on emotional state detection, in accordance with an embodiment of the disclosure. FIGS. 5A and 5B are explained in conjunction with elements from FIGS. 1, 2, 3, 4A, and 4B. With reference to FIG. 5A, there is shown a first home screen 502 on the second electronic device 104. There is further shown a second home screen 504 with a first portrait 506 of a close family member, such as mother, of the user 112, together with the user 112, an emotion-based recommendation 508, and a plurality of applications icons 510, such as a music application icon 510a, a video-streaming application icon 510b, a yoga application icon 510c, and a map application icon 510d.

In accordance with the second exemplary scenario, the second electronic device 104 may be a smart phone or a tablet device. In operation, the emotion handler circuitry 308 of the second electronic device 104, such as the smartphone, may be configured to detect a transition in an emotional state of the user 112 associated with the second electronic device 104 from a first emotional state, such as a neutral, to the second emotional state, such as anger emotional state. The processor 302 of the second electronic device 104 may then dynamically customize the first home screen 502 of the second electronic device 104 based on the detected transition in the emotional state of the user 112 and a last tagged content item associated with the second emotional state in the network device, such as the first electronic device 102.

In response to the detected transition to the anger emotional state of the user 112, the processor 302 of the second electronic device 104 may dynamically change the first home screen 502 to the second home screen 504. For example, a pleasing family picture, such as the first portrait 506, may be automatically set on the second home screen 504 of the second electronic device 104. The emotion-based recommendation 508, such as "Keep calm and drive safely", may be rendered on the second home screen 504.

Further, the music application icon 510a linked to a music application may be pre-loaded with meditation songs suitable for the anger emotional state. The video-streaming application icon 510b linked to a video-streaming application, such as "YouTube application", may be pre-loaded with recommendation of visually soothing videos for a relaxing experience in accordance with the detected anger emotional state. Other examples of customization may be the yoga application icon 510c linked to a yoga application with real-time customized recommendations related to exercises which may relax muscles, may be rendered on selection of the yoga application icon 510c. The map application icon 510d linked to a map application may be pre-loaded with recommendations to visit nearby places, such as a garden, a lake or a games parlor, suitable for relaxation.

It is to be understood that the above mentioned real-time or near real-time customizations on the home screen interface of the second electronic device 104 based on detected emotional state transitions, are exemplary, and explained to indicate practical utility of the disclosed system and method. However, the scope of the present disclosure may not be limited to the above described examples, and other similar customizations may become apparent to one of skill in the art, based on various aspects of the present disclosure, as set forth in the present application and with reference to the drawings.

With reference to FIG. 5B, there is further shown a third home screen 512 on the second electronic device 104. There is further shown wallpaper 514, a joke application icon 510e, a games application icon 510f, the music application icon 510a, and the map application icon 510d rendered in a certain arrangement on the third home screen 512. There is also shown a telephony application 516, a first call recommendation 518a and a second call recommendation 518b on the telephony application 516.

In operation, the emotion handler circuitry 308 of the second electronic device 104, such as the smartphone, may be configured to detect a transition in an emotional state of the user 112 associated with the second electronic device 104 from a neutral emotional state to a sad emotional state. The processor 302 of the second electronic device 104 may then dynamically customize the first home screen 502 (shown in FIG. 5A) of the second electronic device 104. The first home screen 502 may be dynamically customized based on the detected transition in the emotional state of the user 112 and a last tagged content item associated with the sad emotional state in the network device, such as the first electronic device 102.

In response to the detected transition to the sad emotional state of the user 112, the processor 302 of the second electronic device 104 may dynamically change the first home screen 502 to the third home screen 512. For example, a pleasing landscape picture or flowers picture, such as the wallpaper 514, may be automatically set on the third home screen 512. In case of the sad emotional state, the music application icon 510a linked to the music application may then be pre-loaded with melody songs suitable for the sad emotional state. The map application icon 510d linked to the map application may then be pre-loaded with recommendations to visit nearby places, such as a friend's home, suitable to overcome the sad emotional state. Other examples of customization may be the games application icon 510f linked to a game application usually played by the user 112 when in sad emotional state. The joke application icon 510e linked to a jokes application may be rendered, which may be suitable for the sad emotional state.

In accordance with an embodiment, emotion handler circuitry 308 of the second electronic device 104 may be configured to determine a level of the sad emotional state of the user 112. The determined level, such as "6.9", where the numeric value "6" indicates the sad emotional state and the decimal value "0.9" indicates a high level of sadness, such as extreme sadness, on a scale of "0 to 9". In such a scenario, the telephony application 516 may be launched to recommend calling a close friend, a relative, or a family member, when the determined level is greater than a threshold value, as shown in the first call recommendation 518a and the second call recommendation 518b. Thus, the transitions in human emotional states are employed in an intelligent manner to provide emotion-based recommendations with enhanced practical usability.

Figure 6:
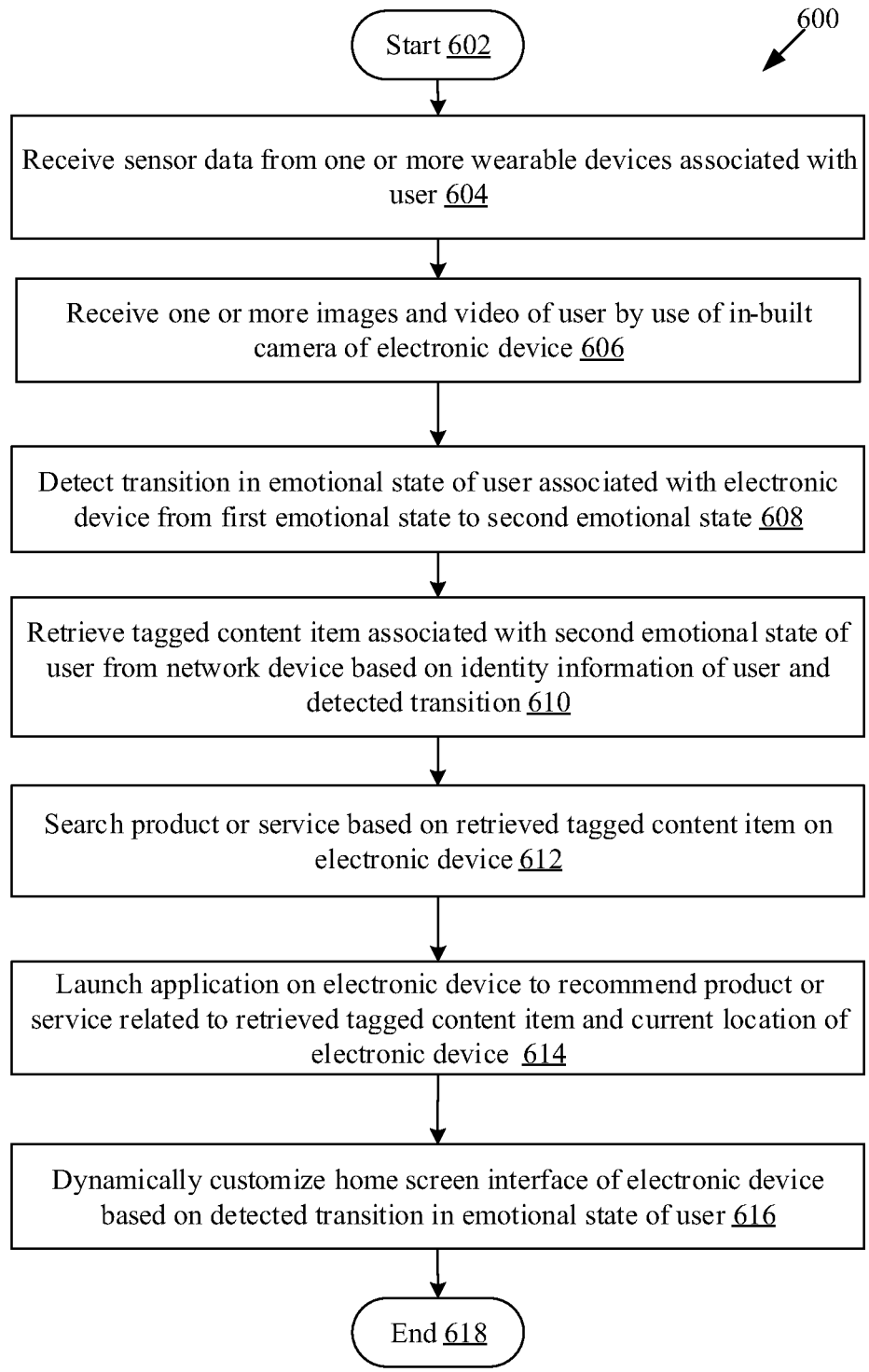
FIG. 6 illustrates a first flow chart to depict an exemplary method to provide recommendation on an electronic device based on emotional state detection of a user, in accordance with an embodiment of the disclosure.

FIG. 6 illustrates a first flow chart to depict an exemplary method to provide recommendation on an electronic device based on emotional state detection of a user, in accordance with an embodiment of the disclosure. With reference to FIG. 6, there is shown a flow chart 600. The flow chart 600 is described in conjunction with elements from the FIGS. 1, 2, 3, 4B, 5A, and 5B. The method, in accordance with the flowchart 600, may be implemented in an electronic device, such as the second electronic device 104. The method starts at step 602 and proceeds to step 604.

At step 604, sensor data associated with the user 112 may be received from the one or more wearable devices 108. In accordance with an embodiment, a text-based input and/or a voice-based input may be received on the electronic device (such as the second electronic device 104), which may be utilized for a detection of a transition in an emotional state of the user 112. At step 606, one or more images or video of the user 112 may be received from an in-built camera, such as the image-capturing unit 104a, by an electronic device (such as the second electronic device 104).

At step 608, a transition in an emotional state of the user 112 associated with the electronic device (such as the second electronic device 104) from a first emotional state to a second emotional state, may be detected. The first emotional state and the second emotional state may correspond to neutral, happy, sad, anger, contempt, fear, surprise, confused, and/or tender of the plurality of emotional states 114. At step 610, a tagged content item associated with the second emotional state of the user 112 may be retrieved from a network device based on identity information of the user 112 and the detected transition. The network device may correspond to the server 106, another electronic device, such as the first electronic device 102, connected to the electronic device, such as the second electronic device 104, in a wireless home network (such as the communication network 110), and/or other cloud based service.

At step 612, a product or a service may be searched based on the retrieved tagged content item on the electronic device (such as the second electronic device 104). The search of the product or the service may be further based on a current location of the electronic device (such as the second electronic device 104). At step 614, an application may be launched on the electronic device (such as the second electronic device 104) to recommend a product or a service related to the retrieved tagged content item. The application may be launched in response to the detected transition in the emotional state of the user 112 and the current location of the electronic device (such as the second electronic device 104).

At step 616, a home screen interface, such as the first home screen 502, of the electronic device may be dynamically customized based on the detected transition in the emotional state of the user 112. The home screen interface of the electronic device (such as the second electronic device 104) may be dynamically customized further based on a last tagged content item associated with the second emotional state in the network device (such as the first electronic device 102 or the server 106). Examples of the customized home screen interface, such as the second home screen 504 and the third home screen 512, has been illustrated and described in FIGS. 5A, and 5B. The control may pass to end step 618.

Figure 7A:
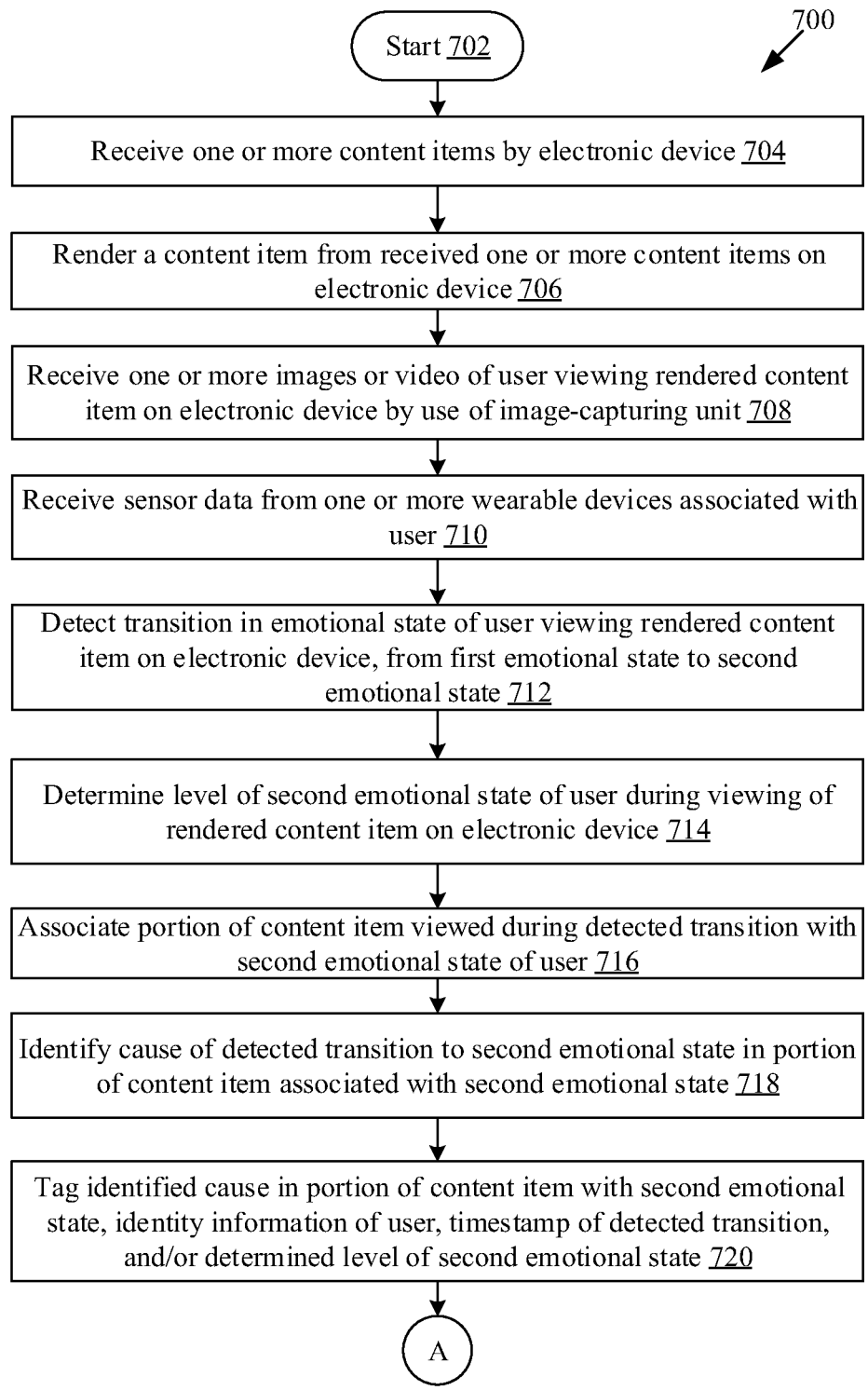
FIGS. 7A and 7B, collectively, illustrate a second flow chart to depict another exemplary method to provide recommendation on an electronic device based on emotional state detection of a user, in accordance with an embodiment of the disclosure.
Figure 7B:
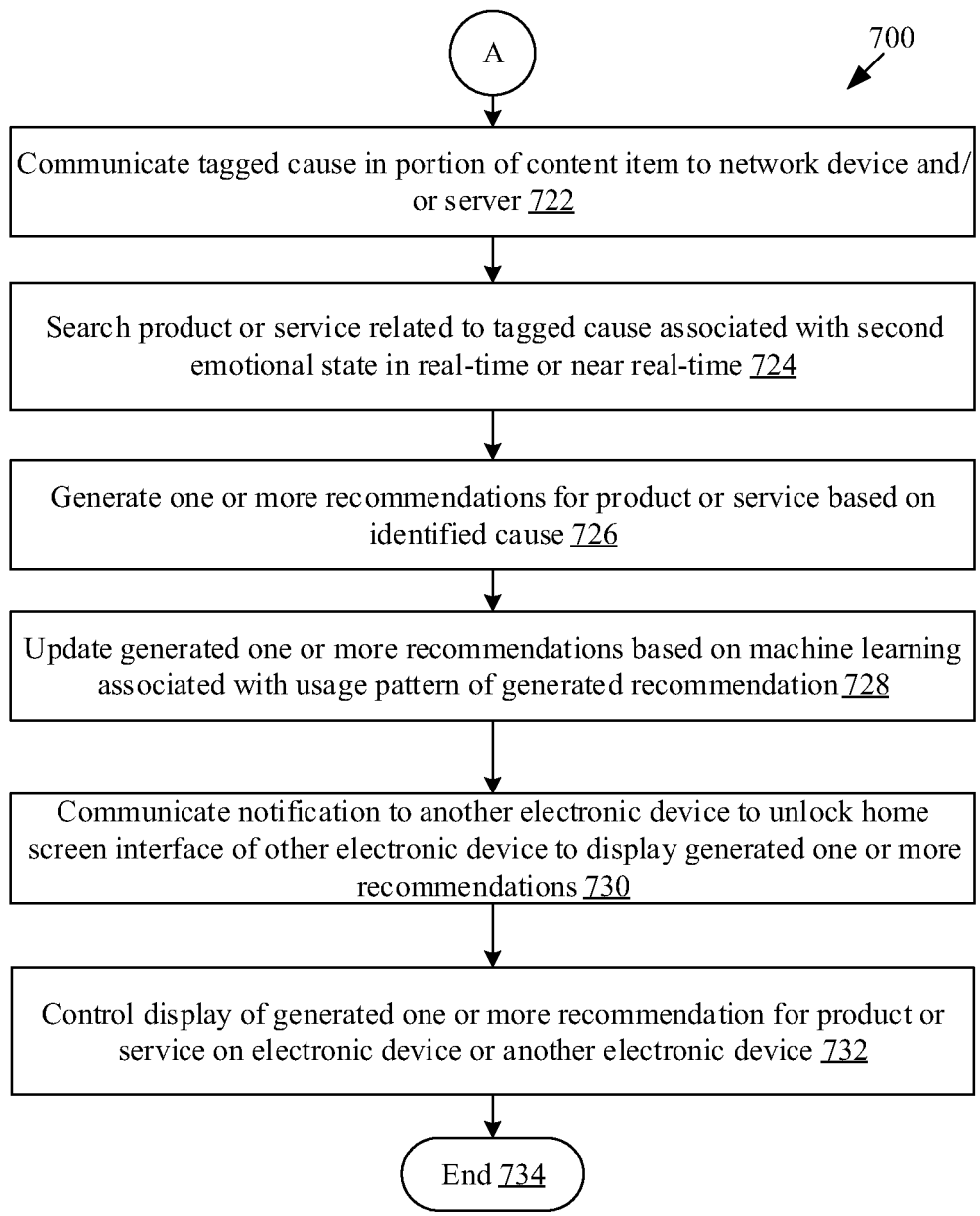

FIGS. 7A and 7B, collectively, illustrate a second flow chart to depict another exemplary method to provide recommendation on an electronic device based on emotional state detection of a user, in accordance with an embodiment of the disclosure. With reference to FIGS. 7A and 7B, there is shown a flow chart 700. The flow chart 700 is described in conjunction with elements from the FIGS. 1, 2, and 4A. The method, in accordance with the flowchart 700, may be implemented in an electronic device, such as the first electronic device 102. The method starts at step 702 and proceeds to step 704.

At step 704, one or more content items may be received by the electronic device (such as the first electronic device 102). At step 706, a content item from the received one or more content items, may be rendered on the electronic device (such as the first electronic device 102).

At step 708, one or more images or a video of the user 112 who may be viewing the rendered content item on the electronic device (such as the first electronic device 102), may be received. The one or more images or the video may be received by use of the image-capturing unit 102a. At step 710, sensor data may be received from the one or more wearable devices 108 (such as the smart band 408) associated with the user 112. In accordance with an embodiment, the sensor data may not be received.

At step 712, a transition in an emotional state of the user 112, viewing the rendered content item on the electronic device, from a first emotional state to a second emotional state, may be detected. At step 714, a level of the second emotional state of the user 112 may be determined during viewing of the rendered content item on the electronic device (such as the first electronic device 102).

At step 716, a portion (such as the first portion 402a) of the content item (such as the video 402) viewed during the detected transition may be associated with the second emotional state of the user 112. The portion of the content item may be associated with the second emotional state when the determined level is greater than a threshold. At step 718, a cause of the detected transition to the second emotional state may be identified in the portion of the content item associated with the second emotional state. The identified cause in the portion of the content item may correspond to an image frame, an object detected in the image frame, and/or a context of the portion of the content item.

At step 720, the identified cause in the portion of the content item may be tagged with the second emotional state, identity information of the user 112, a timestamp of the detected transition, and/or the determined level of the second emotional state. At step 722, the tagged cause in the portion of the content item may be communicated to the server 106 or a network device, such as the second electronic device 104, communicatively coupled to the electronic device, such as the first electronic device 102.

At step 724, a product or a service related to the tagged cause associated with the second emotional state may be searched in real-time or near real-time by use of a pre-specified search engine. In addition to the tagged cause associated with the second emotional state, the search of the product or the service may be further based on a current location of the electronic device (such as the first electronic device 102). At step 726, one or more recommendations may be generated for a product or a service based on the identified cause. The recommendation may be generated in response to the detected transition in the emotional state of the user 112 and the current location of the electronic device (such as the first electronic device 102).

At step 728, the generated one or more recommendations may be updated based on a machine learning associated with a usage pattern of the generated recommendation. The processor 202 may be configured to utilize the recommendations learning engine 214 for such update. At step 730, a notification may be communicated to another electronic device, such as the second electronic device 104, to unlock a home screen interface of the other electronic device to display the generated one or more recommendations.

At step 732, display of the generated recommendation for the product or the service may be controlled on the electronic device (such as the first electronic device 102) or another electronic device (such as the second electronic device 104) communicatively coupled to the electronic device. The control may pass to end step 734.

In accordance with an embodiment of the disclosure, a system to provide recommendation on an electronic device based on emotional state detection of a user, is disclosed. The system (such as the second electronic device 104 (FIG. 1) may comprise one or more circuits (hereinafter referred to as the processor 302 and/or the emotion handler circuitry 308 (FIG. 3)). The emotion handler circuitry 308 may be configured to detect a transition in an emotional state of a user (such as the user 112) associated with the electronic device from a first emotional state to a second emotional state. The processor 302 may be configured to retrieve a tagged content item associated with the second emotional state of the user from a network device based on identity information of the user and the detected transition. The processor 302 may be further configured to launch an application on the electronic device to recommend a product or a service related to the retrieved tagged content item, in response to the detected transition in the emotional state of the user and a current location of the electronic device.

In accordance with an embodiment of the disclosure, another system to provide recommendation on an electronic device based on emotional state detection of a user, is disclosed. The system (such as the first electronic device 102 (FIG. 1) may comprise one or more circuits (hereinafter referred to as the processor 202 and/or the emotion handler circuitry 208 (FIG. 2)). The emotion handler circuitry 208 may be configured to detect a transition in an emotional state of a user (such as the user 112) viewing a content item on the electronic device (such as the first electronic device 102) from a first emotional state to a second emotional state. The emotion handler circuitry 208 may be further configured to associate a portion of the content item viewed during the detected transition, with the second emotional state of the user. The emotion handler circuitry 208 may be further configured to identify a cause of the detected transition to the second emotional state in the portion of the content item associated with the second emotional state. The processor 202 may be configured to generate a recommendation for a product or service based on the identified cause in response to the detected transition in the emotional state of the user and a current location of the electronic device (such as the first electronic device 102).

Various embodiments of the disclosure may provide a non-transitory computer readable medium and/or storage medium, and/or a non-transitory machine readable medium and/or storage medium with a machine code stored thereon, and/or a set of instructions executable by a machine and/or a computer to provide recommendation based on emotional state detection of a user. The set of instructions may cause the machine and/or computer to perform the steps that include detection of a transition in an emotional state of a user (such as the user 112) associated with the electronic device (such as the second electronic device 104) from a first emotional state to a second emotional state. A tagged content item associated with the second emotional state of the user may be retrieved from a network device based on identity information of the user and the detected transition. An application may be launched on the electronic device to recommend a product or a service related to the retrieved tagged content item. The application may be launched in response to the detected transition in the emotional state of the user and a current location of the electronic device (such as the second electronic device 104).

Various embodiments of the disclosure may provide a non-transitory computer readable medium and/or storage medium, and/or a non-transitory machine readable medium and/or storage medium with a machine code stored thereon, and/or a set of instructions executable by a machine and/or a computer to provide recommendation based on emotional state detection of a user. The set of instructions may cause the machine and/or computer to perform the steps that include detection of a transition in an emotional state of a user (such as the user 112) viewing a content item on an electronic device (such as the first electronic device 102) from a first emotional state to a second emotional state. A portion of the content item viewed during the detected transition may be associated with the second emotional state of the user. A cause of the detected transition to the second emotional state may be identified in the portion of the content item associated with the second emotional state. A recommendation may be generated for a product or a service based on the identified cause. The recommendation may be generated in response to the detected transition in the emotional state of the user and a current location of the electronic device.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system, is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:
1. A system, comprising:
 circuitry in a first electronic device configured to:
  display content item;
  receive sensor data from at least one of an in-built camera of said first electronic device, a text-based input device on said first electronic device, or a voice-based input device on said first electronic device;

detect, in association with said content item displayed on said first electronic device, a transition in an emotional state of a user from a first emotional state of said user to a second emotional state of said user, wherein said detection of said transition is based on said received sensor data;

determine a level of said second emotional state at a time of said display of said content item on said first electronic device;

associate a portion of said content item, displayed at said time of said detected transition, with said second emotional state of said user based on said determined level being greater than a threshold level;

identify a cause, of said detected transition to said second emotional state, in said portion of said content item associated with said second emotional state, wherein said identified cause in said portion of said content item corresponds to an object in an image frame, and said content item is analyzed based on an image processing operation to identify said object in said image frame;

generate a recommendation, for one of a product or a service based on said identified cause and a current location of said first electronic device; and communicate a notification to a second electronic device to unlock a home screen interface of said second electronic device for display of said generated recommendation.

2. The system according to claim 1, wherein said identified cause in said portion of said content item further corresponds to at least one of a theme of said portion of said content item or a context of said portion of said content item.

3. The system according to claim 1, wherein said circuitry is further configured to tag said identified cause in said portion of said content item with at least one of said second emotional state, identity information of said user, a timestamp of said detected transition, or said determined level of said second emotional state.

4. The system according to claim 3, wherein said circuitry is further configured to search, by a first search engine, one of said product or said service in one of real-time or near real-time for said recommendation, and said one of said product or said service is related to said cause associated with said second emotional state.

5. The system according to claim 3, wherein said circuitry is further configured to communicate said tagged cause in said portion of said content item to one of a server or a network device communicatively coupled to said first electronic device.

6. The system according to claim 1, wherein said circuitry is further configured to control said display of said generated recommendation for one of said product or said service on said second electronic device communicatively coupled to said first electronic device.

7. The system according to claim 1, wherein said circuitry is further configured to update said generated recommendation based on a machine learning process associated with a usage pattern of said generated recommendation.

8. A method, comprising:

displaying content item;

receiving, by circuitry of a first electronic device, sensor data from at least one of an in-built camera of said first electronic device, a text-based input device on said first electronic device, or a voice-based input device on said first electronic device;

detecting, by said circuitry, a transition in an emotional state of a user from a first emotional state of said user to a second emotional state of said user, wherein said detection of said transition is based on said received sensor data, and said detection is in association with said content item displayed on said first electronic device;

determining, by said circuitry, a level of said second emotional state at a time of said display of said content item on said first electronic device;

associating, by said circuitry, said second emotional state of said user with a portion of said content item displayed at said time of said detected transition, wherein said second emotional state of said user is associated with said portion of said content item based on said determined level being greater than a threshold level;

identifying, by said circuitry, a cause of said detected transition to said second emotional state, wherein said cause is identified in said portion of said content item associated with said second emotional state;

said identified cause in said portion of said content item corresponds to an object in an image frame, and said content item is analyzed based on an image processing operation to identify said object in said image frame;

generating, by said circuitry, a recommendation for one of a product or a service based on said identified cause and a current location of said first electronic device; and communicating, by said circuitry, a notification to a second electronic device to unlock a home screen interface of said second electronic device for display of said generated recommendation.

9. The method according to claim 8, wherein said identified cause in said portion of said content item further corresponds to at least one of a theme of said portion of said content item or a context of said portion of said content item.

* * * * *